US009762756B2

(12) United States Patent
Anezaki et al.

(10) Patent No.: US 9,762,756 B2
(45) Date of Patent: Sep. 12, 2017

(54) COMMUNICATION SYSTEM, COMMUNICATION RELAY APPARATUS, AND RECORDING MEDIUM

(71) Applicant: Konica Minolta, Inc., Tokyo (JP)

(72) Inventors: Kazuya Anezaki, Hyogo (JP); Hirokazu Kubota, Shiga (JP); Kenji Matsuhara, Hyogo (JP); Satoshi Masuda, Osaka (JP); Daisuke Sakiyama, Hyogo (JP); Yuki Asai, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/182,180

(22) Filed: Jun. 14, 2016

(65) Prior Publication Data

US 2016/0366292 A1 Dec. 15, 2016

(30) Foreign Application Priority Data

Jun. 15, 2015 (JP) ................................ 2015-120252

(51) Int. Cl.
*H04N 1/00* (2006.01)
*H04W 40/22* (2009.01)
(Continued)

(52) U.S. Cl.
CPC ..... *H04N 1/00244* (2013.01); *H04L 12/4633* (2013.01); *H04L 12/6418* (2013.01);
(Continued)

(58) Field of Classification Search
CPC .......... H04N 1/00244; H04N 1/00347; H04W 8/005; H04W 40/22; H04L 12/4633
(Continued)

(56) References Cited

U.S. PATENT DOCUMENTS

2009/0172143 A1* 7/2009 Ishimoto ........... H04L 29/12047
709/223
2010/0332456 A1* 12/2010 Prahlad ................. G06F 17/302
707/664
(Continued)

FOREIGN PATENT DOCUMENTS

JP 2012-054729 3/2012
JP 2013-073578 A 4/2013
(Continued)

*Primary Examiner* — Jamares Q Washington
(74) *Attorney, Agent, or Firm* — Osha Liang LLP

(57) ABSTRACT

A communication system includes a plurality of communication relay apparatuses relaying communication between the plurality of devices provided inside a LAN and an external server provided outside the LAN. A first communication relay apparatus performs a device search process of searching the LAN for a device, acquires information on a first management target device which is a device whose communication relay process is managed by a second communication relay apparatus, and determines a second management target device which is a device whose communication relay process is managed by the first communication relay apparatus. The first communication relay apparatus determines the second management target device after removing at least partial duplication of the second management target device and the first management target device, by excluding at least some of the first management target device from two or more devices which are retrieved in the device search process.

27 Claims, 20 Drawing Sheets

(51) Int. Cl.
*H04L 12/46* (2006.01)
*H04W 8/00* (2009.01)
*H04L 12/64* (2006.01)
*H04W 88/04* (2009.01)
*H04W 88/16* (2009.01)

(52) U.S. Cl.
CPC ........ *H04N 1/00347* (2013.01); *H04W 8/005* (2013.01); *H04W 40/22* (2013.01); *H04N 2201/0039* (2013.01); *H04N 2201/0094* (2013.01); *H04W 88/04* (2013.01); *H04W 88/16* (2013.01)

(58) Field of Classification Search
USPC .................. 358/1.15; 709/205, 218, 219, 240
See application file for complete search history.

(56) References Cited

U.S. PATENT DOCUMENTS

| | | | |
|---|---|---|---|
| 2014/0324949 A1 | 10/2014 | Satomi et al. | |
| 2015/0153980 A1* | 6/2015 | Ito | G06F 3/1236 358/1.14 |
| 2015/0172493 A1 | 6/2015 | Anezaki et al. | |

FOREIGN PATENT DOCUMENTS

| | | |
|---|---|---|
| JP | 2014-215846 A | 11/2014 |
| JP | 2015-115831 A | 6/2015 |

* cited by examiner

⟨DEVICE LIST 302 OF OTHER GATEWAY 202⟩

MANAGEMENT DEVICE LIST 302 OF OTHER GATEWAY 202

EXCLUDE DEVICE 204 (DEVICE DURING SLEEP)

COMMUNICATION SYSTEM, COMMUNICATION RELAY APPARATUS, AND RECORDING MEDIUM

This application is based on Japanese Patent Application No. 2015-120252 filed on Jun. 15, 2015, the contents of which are hereby incorporated by reference.

BACKGROUND OF THE INVENTION

Field of the Invention

The present invention relates to a communication system which performs communication between a server outside a LAN and devices inside the LAN, and its relevant technique.

Description of the Background Art

There is a technique for ensuring cooperation between a server (a cloud server or the like) outside a LAN and devices (an image forming apparatus and the like) inside the LAN.

There is, for example, a technique for printing out an electronic document stored in a server on a cloud (a cloud server) by using an image forming apparatus on a local side (inside a LAN) (see Japanese Patent Application Laid Open Gazette No. 2013-73578 (Patent Document 1)).

In Patent Document 1, disclosed is a document output system (communication system) which comprises an image forming apparatus (device), a gateway, and a cloud server. In the system, an electronic document stored in the cloud server is sent to the image forming apparatus through the gateway and the like and printed out in the image forming apparatus 10. Further, the gateway and the image forming apparatus (device) are provided inside a LAN and the cloud server is provided outside the LAN.

In such a system as above, usually, a fire wall is provided between the image forming apparatus (device) inside the LAN and the cloud server outside the LAN.

Access from the image forming apparatus inside the LAN to the cloud server outside the LAN passes through the fire wall and is allowed.

Reverse access, i.e., direct access from the cloud server outside the LAN to the image forming apparatus inside the LAN, however, is blocked by the fire wall. In other words, the cloud server cannot directly access the image forming apparatus.

In contrast to this, there is a possible technique in which a message session (communication session) (as an exception to a fire wall) is established between a management server outside a LAN and a gateway (communication relay apparatus) inside the LAN and then access is made from the cloud server outside the LAN to the image forming apparatus inside the LAN via the management server and the gateway.

FIGS. 19 and 20 show such a technique as above. At start up or the like, gateways 30 (30a, 30b) establish message sessions (511, 512) with a management server 50 which is specified in advance (see thick lines in FIG. 19). After that, as shown in FIG. 20, when a cloud server 70 issues an access request for a specific device 10d, by using the message session (e.g., 511) between the management server 50 and one gateway 30 (e.g., 30a), the management server 50 sends a tunnel connection request to the gateway 30a. On the basis of the tunnel connection request, the gateway 30a establishes a tunnel communication with the cloud server 70. Then, by using the tunnel communication, the cloud server 70 makes access to the device (image forming apparatus) 10d (via the gateway 30). This technique will be described later in detail.

Further, the similar technique is disclosed in Japanese Patent Application Laid Open Gazette No. 2014-215846 (Patent Document 2).

In the above system, a plurality of gateways are provided inside the LAN. Each of the plurality of gateways relays communication between a device which is a management target thereof and the cloud server.

It can be thought that the plurality of gateways each determine its management target device, for example, as follows. Specifically, each of the gateways in the same network determines a device which is uniquely selected among the plurality of devices in the network, as a management target device thereof.

When each gateway uniquely determines the management target device thereof as above, however, there is a probability that a device may be selected duplicately by a plurality of gateways as the management target device thereof. For example, there arises a case where one gateway determines four devices 203, 204, 205, and 206 as management target devices thereof and another gateway also determines four devices 203, 204, 205, and 206 as management target devices thereof. In such a case, these two gateways have absolutely the same four devices as the management target devices thereof and there occurs great duplication. In other words, there occurs a great waste.

SUMMARY OF THE INVENTION

One or more embodiments of the invention provide a technique for efficiently managing a plurality of devices by a plurality of communication relay apparatuses.

One or more embodiments of the present invention are intended for a communication system. According to a first aspect of the present invention, the communication system includes a plurality of devices provided inside a predetermined LAN and a plurality of communication relay apparatuses provided inside the predetermined LAN, relaying communication between the plurality of devices and an external server provided outside the predetermined LAN, and in the communication system of the present invention, the plurality of communication relay apparatuses have a first communication relay apparatus and a second communication relay apparatus, the first communication relay apparatus has a search part for performing a device search process of searching the predetermined LAN for a device, an acquisition part for acquiring information on at least one first management target device which is a device whose communication relay process with the external server is managed by the second communication relay apparatus, and a determination part for determining at least one second management target device which is a device whose communication relay process with the external server is managed by the first communication relay apparatus, and the determination part determines the at least one second management target device after removing at least partial duplication of the at least one second management target device and the at least one first management target device, by excluding at least some of the at least one first management target device from two or more devices which are retrieved in the device search process, on the basis of the two or more devices and management device information which is the information on the at least one first management target device.

The present invention is also intended for a communication relay apparatus which is one communication relay apparatus among a plurality of communication relay apparatuses which relay communication between an external server provided outside a predetermined LAN and a plurality of devices provided inside the predetermined LAN. According to a second aspect of the present invention, the communication relay apparatus includes a search part for performing a device search process of searching the predetermined LAN for a device, an acquisition part for acquiring information on at least one first management target device which is a device whose communication relay process with the external server is managed by a second communication relay apparatus which is a communication relay apparatus other than the one communication relay apparatus among the plurality of communication relay apparatuses provided inside the predetermined LAN, and a determination part for determining at least one second management target device which is a device whose communication relay process with the external server is managed by a first communication relay apparatus which is the one communication relay apparatus among the plurality of communication relay apparatuses, and in the communication relay apparatus of the present invention, the determination part determines the at least one second management target device after removing at least partial duplication of the at least one second management target device and the at least one first management target device, by excluding at least some of the at least one first management target device from two or more devices which are retrieved in the device search process, on the basis of the two or more devices and management device information which is the information on the at least one first management target device.

The present invention is still also intended for a non-transitory computer-readable recording medium. According to a third aspect of the present invention, the non-transitory computer-readable recording medium records therein a computer program to be executed by a computer embedded in one communication relay apparatus among a plurality of communication relay apparatuses which relay communication between an external server provided outside a predetermined LAN and a plurality of devices provided inside the predetermined LAN, to cause the computer to perform the steps of: a) performing a device search process of searching the predetermined LAN for a device, b) acquiring information on at least one first management target device which is a device whose communication relay process with the external server is managed by a second communication relay apparatus which is a communication relay apparatus other than the one communication relay apparatus among the plurality of communication relay apparatuses provided inside the predetermined LAN, and c) determining at least one second management target device which is a device whose communication relay process with the external server is managed by a first communication relay apparatus which is the one communication relay apparatus among the plurality of communication relay apparatuses, and in the non-transitory computer-readable recording medium of the present invention, the at least one second management target device is determined in the step c) after removing at least partial duplication of the at least one second management target device and the at least one first management target device, by excluding at least some of the at least one first management target device from two or more devices which are retrieved in the device search process in the step a), on the basis of the two or more devices and management device information which is the information acquired in the step b).

These and other objects, features, aspects and advantages of the present invention will become more apparent from the following detailed description of the present invention when taken in conjunction with the accompanying drawings.

DETAILED DESCRIPTION

Hereinafter, one or more embodiments of the present invention will be described with reference to the accompanying drawings.

1. The First Embodiment

<1-1. Overall Constitution of System>

Figure 1:
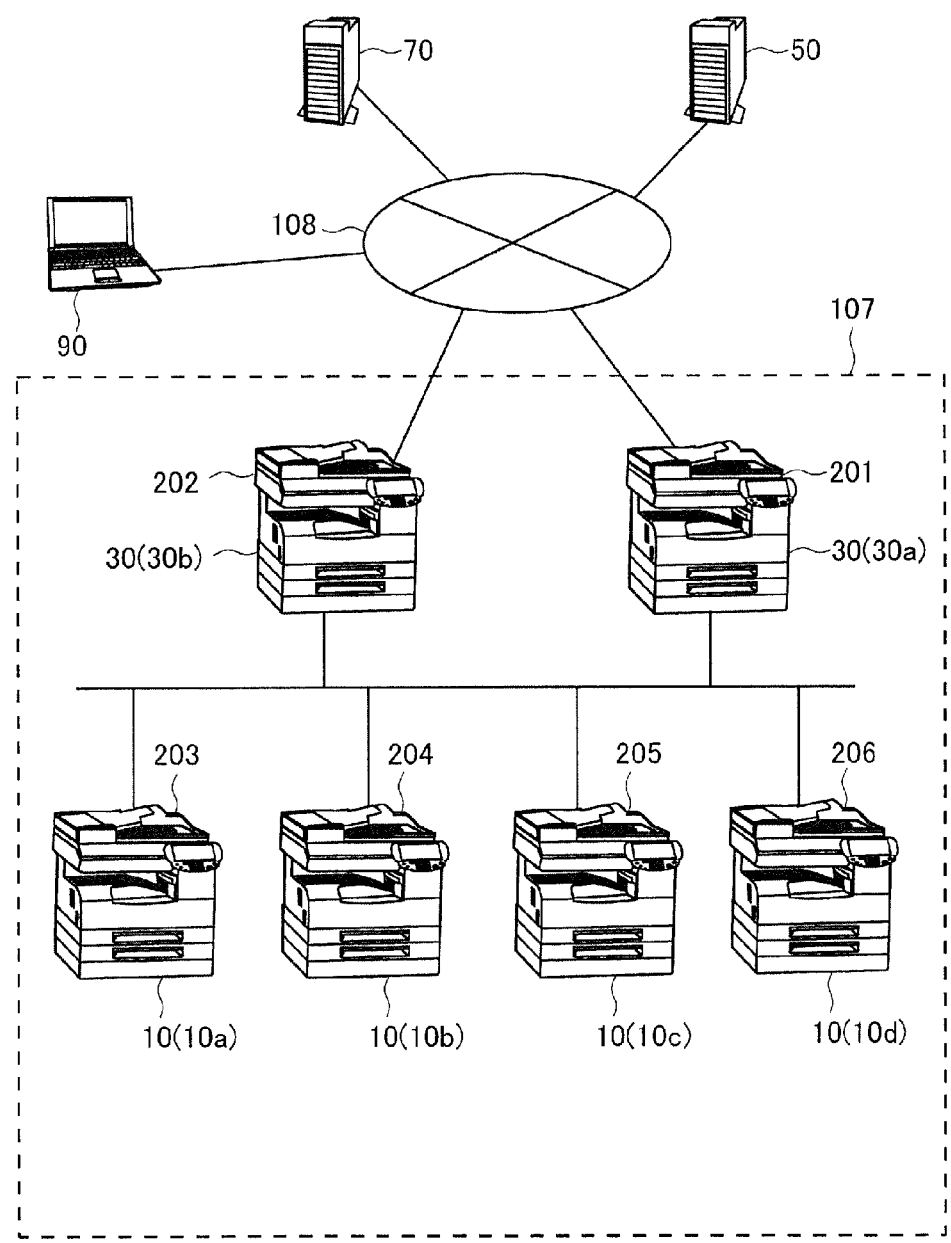
FIG. 1 is a view showing a schematic configuration of a communication system in accordance with one or more embodiments.

FIG. 1 is a view showing a schematic configuration of a communication system 1 in accordance with one or more embodiments of the present invention. As shown in FIG. 1, the communication system 1 comprises a plurality of devices 10 (10a, 10b, 10c, . . . ) and a plurality of gateways 30 (30a, 30b). The communication system 1 further comprises a management server computer (hereinafter, also referred to simply as a "management server") 50, a cloud server computer (hereinafter, also referred to simply as a "cloud server") 70, and a client computer (hereinafter, also referred to simply as a "client") 90.

The constituent elements 10, 30, 50, 70, and 90 are connected with one another through a network 108, and capable of performing network communication with one another. Further, the network 108 includes a LAN (Local Area Network), a WAN (Wide Area Network), the internet, and the like. The connection between each of the constituent elements and the network 108 may be a wired connection or a wireless connection.

The plurality of devices 10 and the plurality of gateways 30 are provided inside a LAN 107 which is constructed in a company or the like. On the other hand, the management server 50, the cloud server 70, and the client 90 are provided outside the LAN 107. Further, the client 90 may be provided inside the LAN 107.

Herein, as an example of the device 10, shown is a Multi-Functional Peripheral (also abbreviated as an "MFP"). The MFP is also referred to as an image forming apparatus, a communication apparatus, or the like.

Further, the gateway 30 is constructed herein in an MFP other than the MFP as the device 10. Specifically, the gateway 30 is implemented by executing a software (program) incorporated in an MFP as a hardware.

On the other hand, the management server 50, the cloud server 70, and the client 90 are constructed by using a so-called personal computer or the like.

In the communication system 1, for example, a printing instruction sent from the client 90 to the cloud server 70 is transmitted to the device 10 via the management server 50 and the gateway 30 and then a printing operation is performed in the device (MFP) 10.

The plurality of gateways 30 each have a function of relaying communication between each of the plurality of devices 10 and the cloud server 70, and each of the gateways 30 is also referred to as a "communication relay apparatus".

The management server 50 is an apparatus for managing communication between the cloud server 70 and the plurality of gateways 30, or the like. The management server 50 receives an access request for a specific device among the plurality of devices 10 from the cloud server 70 and sends a request (tunnel connection request) for tunnel connection with the cloud server 70 to one of the plurality of gateways 30 in response to the access request.

<1-2. Overall Constitution of MFP>

Figure 2:
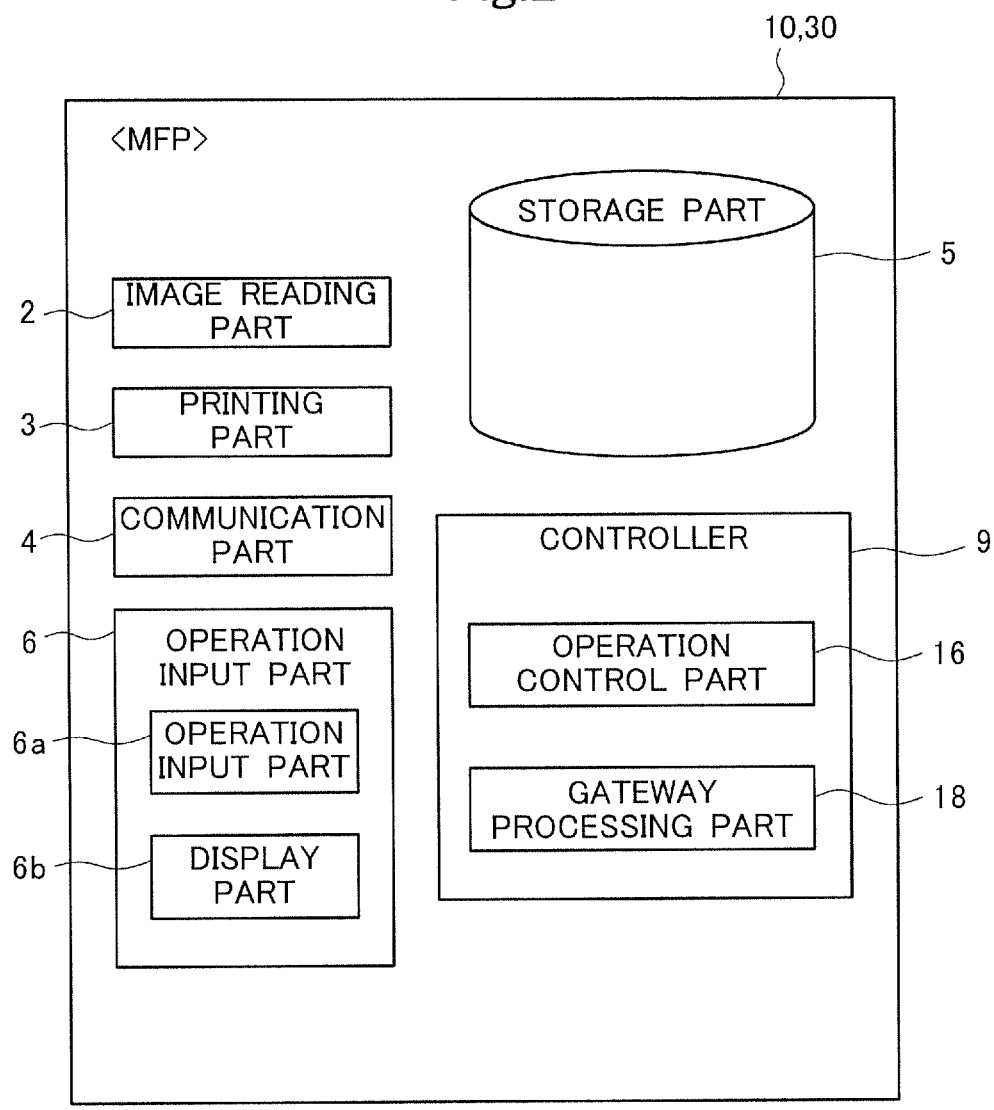
FIG. 2 is a schematic diagram showing a constitution of an MFP in accordance with one or more embodiments.

FIG. 2 is a schematic diagram showing a constitution of the MFP. The MFP is an apparatus (also referred to as a multifunction machine) having a scanner function, a printing function, a copy function, a data communication function, and the like.

The MFP is an image forming apparatus which is capable of performing a printing operation, an image reading operation (scanning operation), and the like. In one embodiment, a plurality of MFPs 200 (201 to 206) are provided inside the LAN 107. Further, some MFPs 201 and 202 among the plurality of MFPs 201 to 206 operate as the gateways 30.

As shown in FIG. 2, the MFP comprises an image reading part 2, a printing part 3, a communication part 4, a storage part 5, an input/output part 6, a controller 9, and the like and multiply uses these constituent parts to implement various functions.

The image reading part 2 is a processing part which optically reads an original manuscript placed on a predetermined position of the MFP and generates image data of the original manuscript (also referred to as an "original manuscript image").

The printing part 3 is an output part which prints out an image to various media such as paper on the basis of the image data on an object to be printed.

The communication part 4 is a processing part capable of performing facsimile communication via public networks or the like. Further, the communication part 4 is capable of performing network communication via the network 108. The network communication uses various protocols such as TCP/IP (Transmission Control Protocol/Internet Protocol), FTP (File Transfer Protocol), and the like. By using the network communication, the MFP can transmit and receive various data to/from desired partners (the management server 50, the cloud server 70, and the like).

More in detail, the communication part 4 of the MFP operating as the gateway 30 can perform communication with the management server 50 (particularly, receive data from the management server 50) by using a message session (described later) established between the gateway 30 and the management server 50. The communication part 4 of the MFP operating as the device 10 can also perform communication with the cloud server 70 (particularly, receive data from the cloud server 70) by using a tunnel connection (described later) established between the gateway 30 and the cloud server 70. Further, the communication part 4 has a transmitting part for transmitting data or the like to other apparatuses and a receiving part for receiving data or the like from other apparatuses.

The storage part 5 is a storage unit such as a hard disk drive (HDD), a nonvolatile memory, or/and the like.

The input/output part 6 comprises an operation input part 6a for receiving an input which is given to the MFP and a display part 6b for displaying various information thereon. The input/output part 6 is also referred to as an operation part.

The controller 9 is a control unit for generally controlling the MFP, and comprises a CPU and various semiconductor memories (RAM, ROM, and the like).

The controller 9 causes the CPU to execute a predetermined software program (also referred to simply as a "program") stored in the ROM (e.g., EEPROM or the like), to thereby implement various processors/processing parts (an operation control part 16 for controlling an image forming operation or the like, a gateway processing part 18 described later, and the like).

The controller 9 of the MFP operating as the gateway 30, for example, implements the gateway processing part 18 (including a communication control part 41, a management information acquisition part 45, a management information generation part 46 (see FIG. 3 (described later)), and the like). The controller 9 of the MFP operating only as the device 10 may have the same processing parts but may not have the processing parts for implementing the function as the gateway 30. Further, the program may be recorded in one of various portable recording media (such as a USB memory and the like) (in other words, various non-transitory computer-readable recording media), and read out from the recording medium to be installed in the MFP. Alternatively, the program may be downloaded via the network 108 or the like to be installed in the MFP.

<1-3. Overall Constitution of Constituent Elements>

Figure 3:
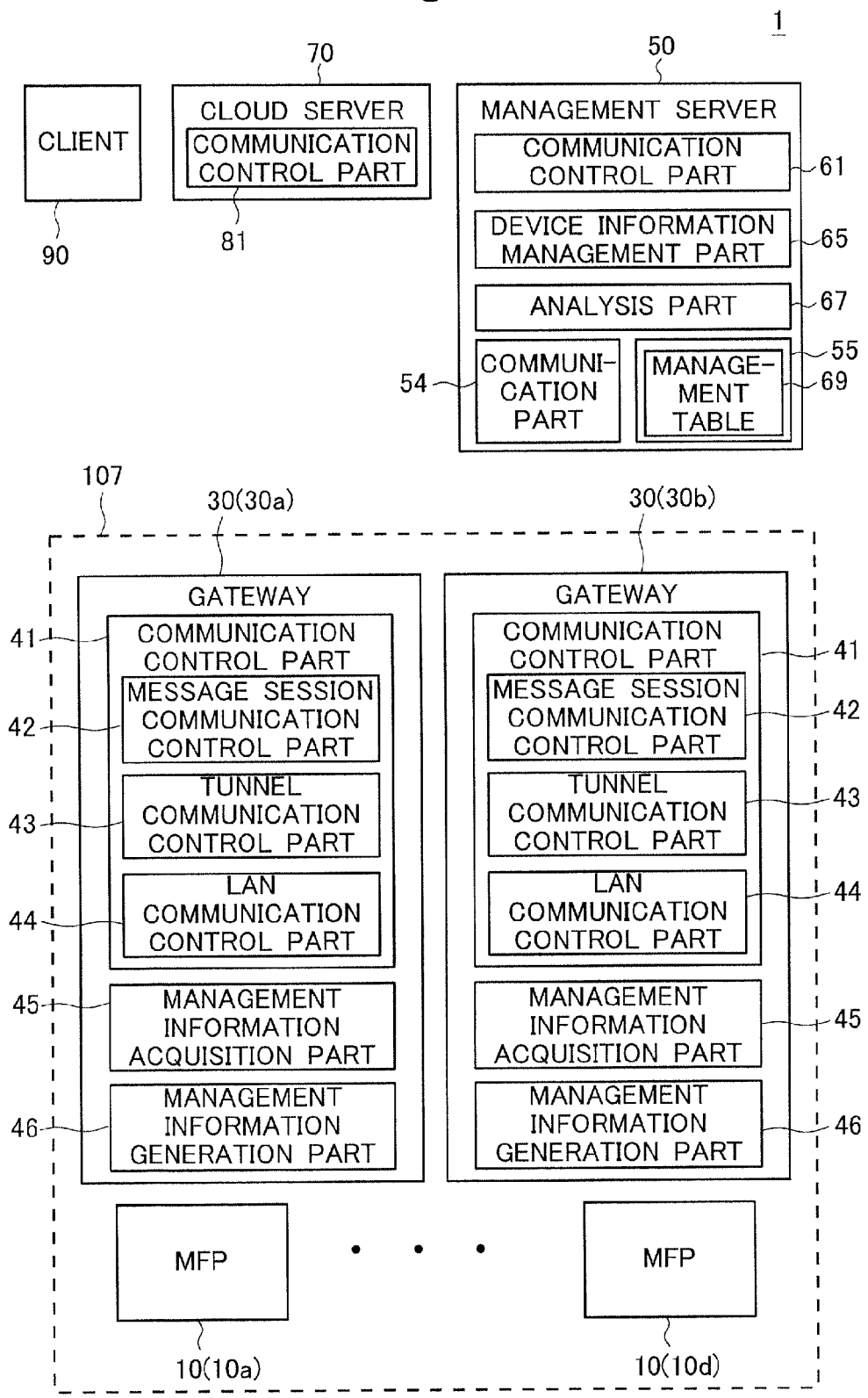
FIG. 3 is a view showing respective schematic constitutions of various apparatuses in accordance with one or more embodiments.

FIG. 3 is a view showing respective schematic constitutions of the constituent elements 30, 50, 70, and the like. With reference to FIG. 3, these constituent elements will be described.

<Cloud Server 70>

The cloud server 70 comprises a communication control part 81. The communication control part 81 performs communication with the management server 50. Further, the communication control part 81 performs communication with each of the gateways 30 by using the tunnel communication (described later).

<Management Server 50>

The management server 50 comprises various processing parts such as a communication control part 61, a device information management part 65, an analysis part 67, and the like.

A CPU of the management server 50 executes a predetermined software program (also referred to simply as a "program") stored in a storage part (HDD or the like), to thereby implement these processing parts. Further, the program may be recorded in one of various portable recording media (such as a DVD-ROM and the like) (in other words, various non-transitory computer-readable recording media), and read out from the recording medium to be installed in the management server 50. Alternatively, the program may be downloaded via the network 108 or the like to be installed in the management server 50.

The communication control part 61 controls various communication operations in cooperation with a communication part 54 (communication hardware). The communication control part 61 performs, for example, communication with the cloud server 70, to thereby receive the access request from the cloud server 70. Further, the communication control part 61 performs communication with the gateways 30 by using the message session (described later). The communication part 54 has a transmitting part for transmitting data or the like to other apparatuses and a receiving part for receiving data or the like from other apparatuses.

The device information management part 65 is a processing part for managing information (management gateway information) on the plurality of gateways 30 which are management targets to be managed by the management server 50, management device information (information on the devices which are management targets to be managed by each gateway 30) received from each of the plurality of gateways 30, and the like. These information (the management gateway information and the management device information) are described in a management table 69 stored in a storage part (HDD (hard disk drive) or the like) 55 of the management server 50. In the management table 69, described are the management gateway information (identification information (e.g., IP address) or the like of each gateway 30), the management device information indicating a relation between each gateway 30 and the devices (management target devices) under the control of the gateway 30, and the like.

The analysis part 67 is a processing part for analyzing the content of the access request received from the cloud server 70 and determining the gateway 30 which is capable of relaying the communication with a connection target device 10 in accordance with the access request, on the basis of the management table 69. The analysis part 67 is also expressed as a relay apparatus determination part for determining the gateway 30 (the communication relay apparatus) to be used.

Further, the communication control part 61, the communication part 54, and the like send the tunnel connection request indicating that a tunnel connection with the cloud server 70 should be established, to the gateway 30 (the communication relay apparatus) determined by the analysis part (relay apparatus determination part) 67.

When the gateway 30 (the communication relay apparatus) determined by the analysis part (relay apparatus determination part) 67 receives the tunnel connection request, the gateway 30 (the communication relay apparatus) establishes the tunnel connection with the cloud server 70 in response to the tunnel connection request. Then, the gateway 30 relays the communication between the cloud server 70 and the connection target device 10 by using the tunnel connection.

<Gateway 30>

Each gateway 30 comprises various processing parts such as the communication control part 41, the management information acquisition part 45, the management information generation part 46, and the like. The controller 9 of the gateway 30 (MFP) executes a predetermined program, to thereby implement these processing parts.

The communication control part 41 is a processing part for controlling communication with other apparatuses. The communication control part 41 has a message session communication control part 42, a tunnel communication control part 43, and a LAN communication control part 44.

The LAN communication control part 44 is a processing part for performing communication with various apparatuses inside the LAN. The LAN communication control part 44 (a search part) performs a device search process of searching the LAN 107 for a device, for example, by sending (broadcasting) a broadcast packet for device search to various apparatuses inside the same LAN, or the like.

On the other hand, the message session communication control part 42 and the tunnel communication control part 43 are processing parts for performing communication with various apparatuses outside the LAN.

The message session communication control part 42 is a processing part for performing communication with the management server 50 by using the message session (described later). The message session communication control part 42 establishes the message session (described later) with the management server 50 and thereby performs the communication with the management server 50. The message session communication control part 42 is also referred to as a management server communication part.

The tunnel communication control part 43 is a processing part for performing communication with the cloud server 70 by using the tunnel communication (described later). The tunnel communication control part 43 establishes the tunnel communication with the cloud server 70 and thereby relays communication between the cloud server 70 and a specific device 10. The tunnel communication control part 43 is also referred to as a cloud server communication part.

As described later, by using the message session, data can be transmitted from an apparatus (the management server 50) outside the LAN 107 to an apparatus (the gateway 30) inside the LAN 107. Further, by using the tunnel connection, data can be transmitted from an apparatus (the cloud server 70) outside the LAN 107 to apparatuses (the gateway 30 and the device 10) inside the LAN 107.

The management information acquisition part 45 is a processing part for collecting information on devices existing inside the same LAN (further, information on devices 10 existing under the control of the gateway 30). The management information acquisition part 45 also collects information (management device information) on the devices 10 existing under the control of another gateway 30 (management target devices (communication relay target devices) which are to be managed by another gateway 30).

Further, the management information generation part 46 is a processing part for determining a device 10 to be placed under the control of the gateway 30 (a management target device of the gateway 30), on the basis of the management device information or the like acquired by the management information acquisition part 45.

<1-4. Overall Operation>

Figure 19:
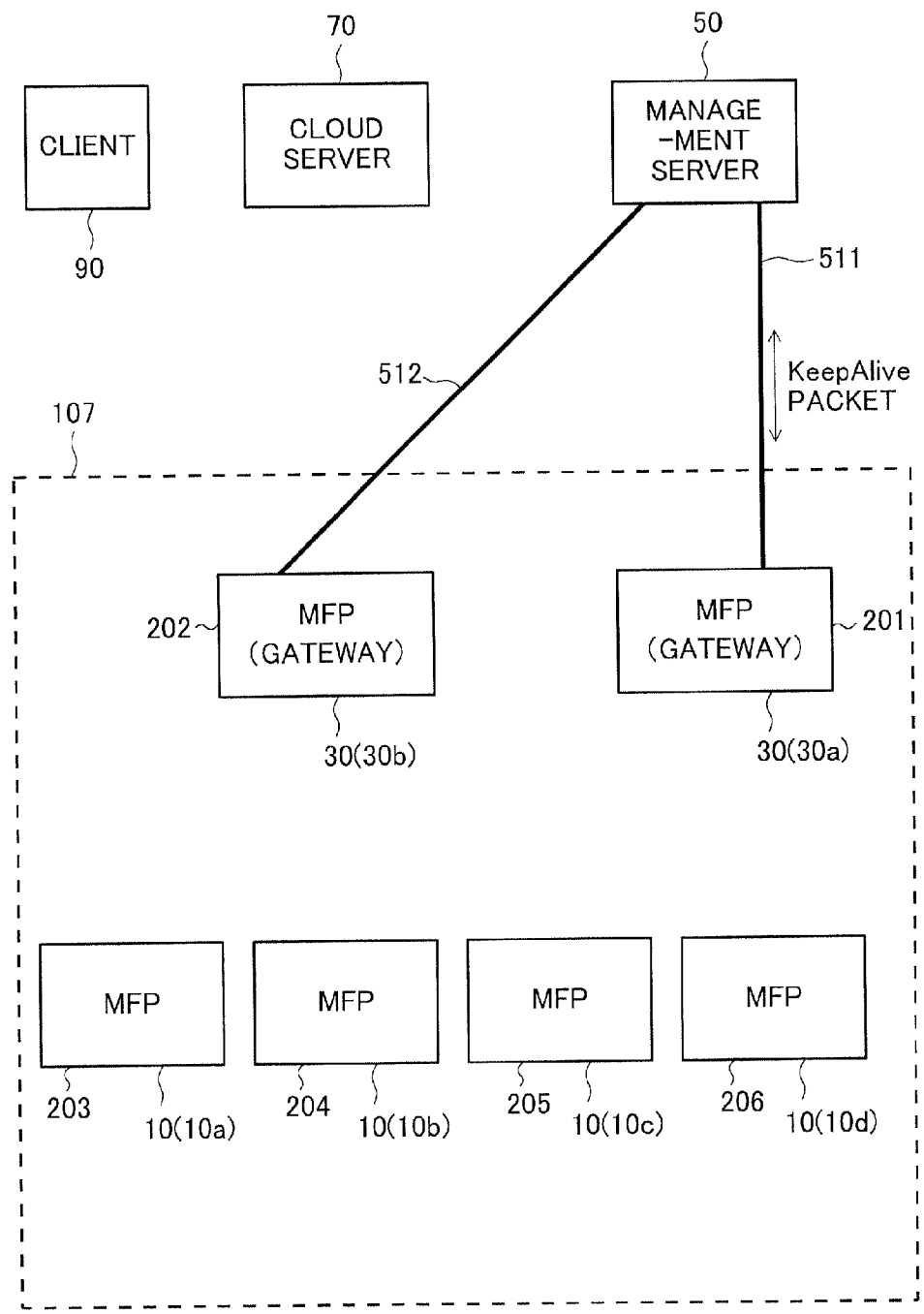
FIG. 19 is a conceptual diagram showing an operation of a communication system in accordance with one or more embodiments.

In one embodiment, performed is such an operation as described above and shown in FIGS. 19 and 20. Specifically, the message session (as an exception to a fire wall) is established between the management server 50 outside the LAN and the gateway 30 inside the LAN, and then access is made from the cloud server 70 outside the LAN to the image forming apparatus inside the LAN via the management server 50 and the gateway 30. First, such an operation will be described below.

Figure 20:
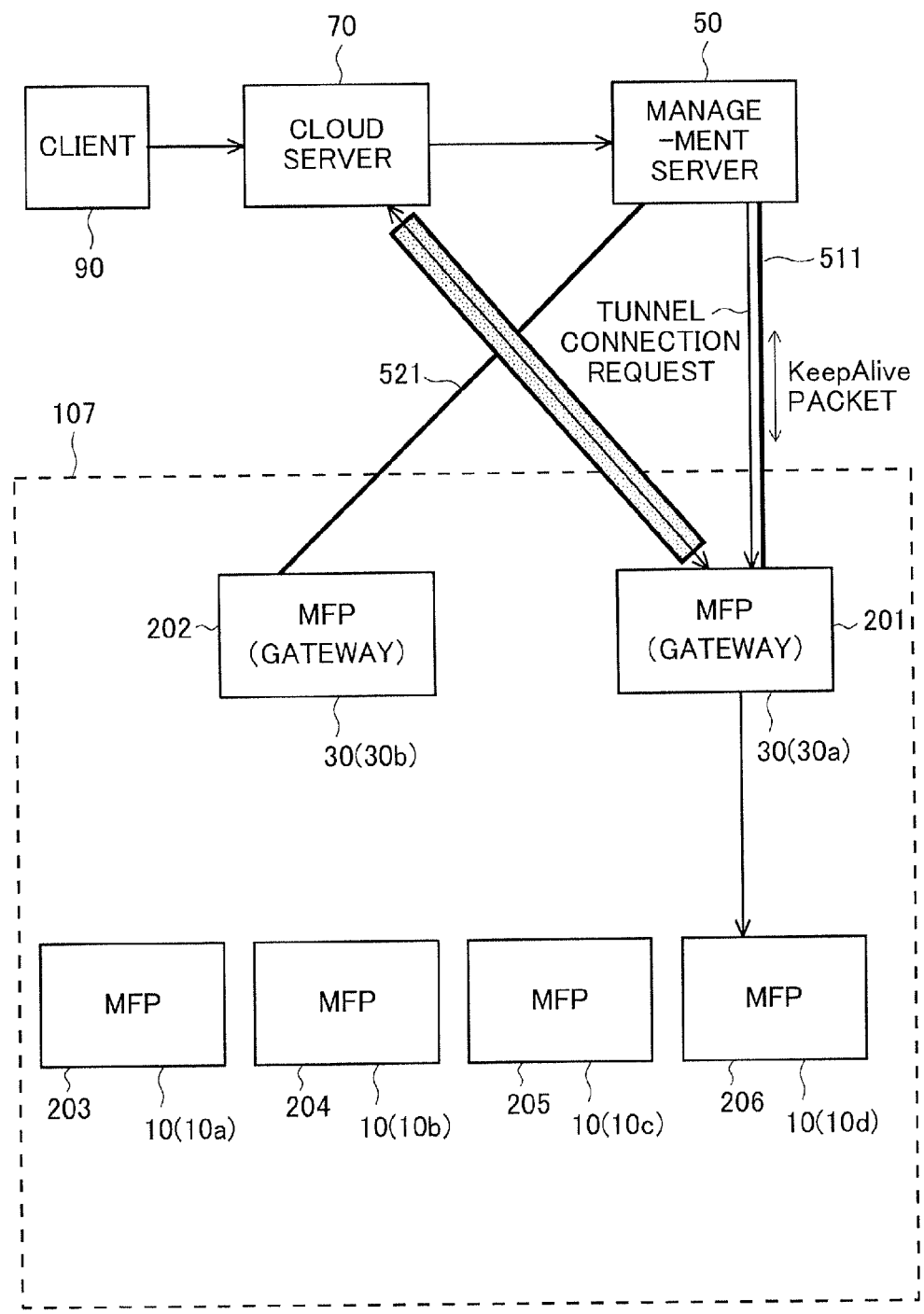
FIG. 20 is a conceptual diagram showing an operation of the communication system in accordance with one or more embodiments.

As described above (see FIG. 19), at start up or the like, the gateways 30 establish, in advance, communication sessions (in detail, message sessions) (511, 512) with the management server 50 which is specified in advance. After that, as shown in FIG. 20, when the cloud server 70 issues the access request for a specific device 10, by using the message session (regular connection communication session) (511) between the management server 50 and one gateway 30 (30a), the management server 50 sends the tunnel connection request to the gateway 30a. On the basis of the tunnel connection request, the gateway 30a establishes a tunnel communication with the cloud server 70. Then, by using the tunnel communication, the cloud server 70 makes access to the device (image forming apparatus) 10 (via the gateway 30).

More in detail, first, at start up or the like, each of the gateways 30 sends a connection request (an establishment request) of message session to the management server 50 which is specified in advance. When the management server 50 approves the establishment request in response to this, the message session (511 or 521) is established between each of the gateways 30 and the management server 50. In other words, the message session is established in response to the access from the gateway 30 inside the LAN 107 to the management server 50 outside the LAN 107. As such a message session (communication session), for example, there is a session using a protocol such as "XMPP:eXtensible Messaging and Presence Protocol" or the like. Further, as described later, each of the gateways 30 sends information (device lists 300) on devices (management target devices) under the control of the gateway 30 and the like to the management server 50. The management server 50 stores registration information (the management table 69) including information on the management target devices of the gateway 30 (information described in each of the device lists 300) into the storage part 55 of the management server 50 (FIG. 3).

Then, by using the message session between the management server 50 and the gateway 30, the access from the cloud server 70 to the device (image forming apparatus) 10 can be made.

More in detail, when the cloud server 70 intends to make access to (communication with) a specific device 10b, first, the cloud server 70 sends the access request for the specific device 10b to the management server 50.

The management server 50 specifies the gateway 30 corresponding to the specific device 10 (a specific gateway 30a or the like which places the specific device 10b under the control thereof) on the basis of management information (the management table 69). In other words, the gateway 30 to be accessed is specified on the basis of the management table 69. Further, this is only one exemplary case, and for example, the gateway 30 to be accessed may be specified in advance by a user or the like, together with the specific device 10 to be accessed or the like. Then, the gateway 30 to be accessed may be specified on the basis of such a specification.

Further, the management server 50 sends the tunnel connection request to the gateway 30 which is specified.

First, for example, when the cloud server 70 sends the access request for the specific device 10d to the management server 50, the management server 50 specifies the gateway (30a) corresponding to the specific device 10d on the basis of the management information (the management table 69). Further, when there are a plurality of gateways corresponding to the specific device 10d, one of the plurality of gateways may be selected as appropriate.

Next, when the message session 511 is established between the management server 50 and the specific gateway 30a (corresponding to the specific device 10d), the management server 50 sends the tunnel connection request to the specified gateway 30a through the message session 511. The "tunnel connection request" refers to a connection request (an establishment request) indicating that a tunnel connection should be established with the cloud server 70. Thus, when the message session 511 is established between the management server 50 and the specific gateway 30a, the tunnel connection request is transmitted by using the message session 511 between the management server 50 and the gateway 30a.

The gateway 30 which receives the tunnel connection request sends an establishment request of an HTTP (Hypertext Transfer Protocol) session (more in detail, an HTTPS (Hypertext Transfer Protocol Secure) session) to the cloud server 70, in response to the tunnel connection request. Then, the cloud server 70 approves the establishment request and the tunnel connection (tunnel communication) using the HTTP session is thereby established between the gateway 30 and the cloud server 70. In other words, the tunnel connection (tunnel communication) is established in response to the access from the gateway 30 inside the LAN 107 to the cloud server 70 outside the LAN 107. Then, by using the tunnel communication with this HTTP session, the cloud server 70 can send various data to the device 10 (e.g., 10d) via the gateway 30. Such an establishment request of the HTTP (HTTPS) session is also referred to as an establishment request of the tunnel connection. Further, in FIG. 20, the "tunnel communication" is schematically represented by an elongated rectangle with sand hatch pattern.

When there are a plurality of gateways inside the LAN, as mentioned above, there arises a case where a plurality of gateways overlappingly have the same management target devices.

Specifically, there arises a case, for example, where one gateway has four devices 203, 204, 205, and 206 as its management target devices and another gateway also has the same four devices 203, 204, 205, and 206 as its management target devices. In this case, these two gateways have absolutely the same four devices as the management target devices thereof and there occurs great duplication. In other words, there occurs a great waste.

Then, in this embodiment, a technique for avoiding such duplication and ensuring efficient management of a plurality of devices by a plurality of gateways will be shown. For example, the gateway 30a at least excludes all the management target devices of another gateway 30b from two or more devices inside the same LAN and then determines its own management target devices. It is thereby possible to remove duplication of the management target devices among a plurality of gateways and appropriately determine the management target devices of the gateway 30a.

<1-5. Operation for Determining Management Target Device>

Figure 4:
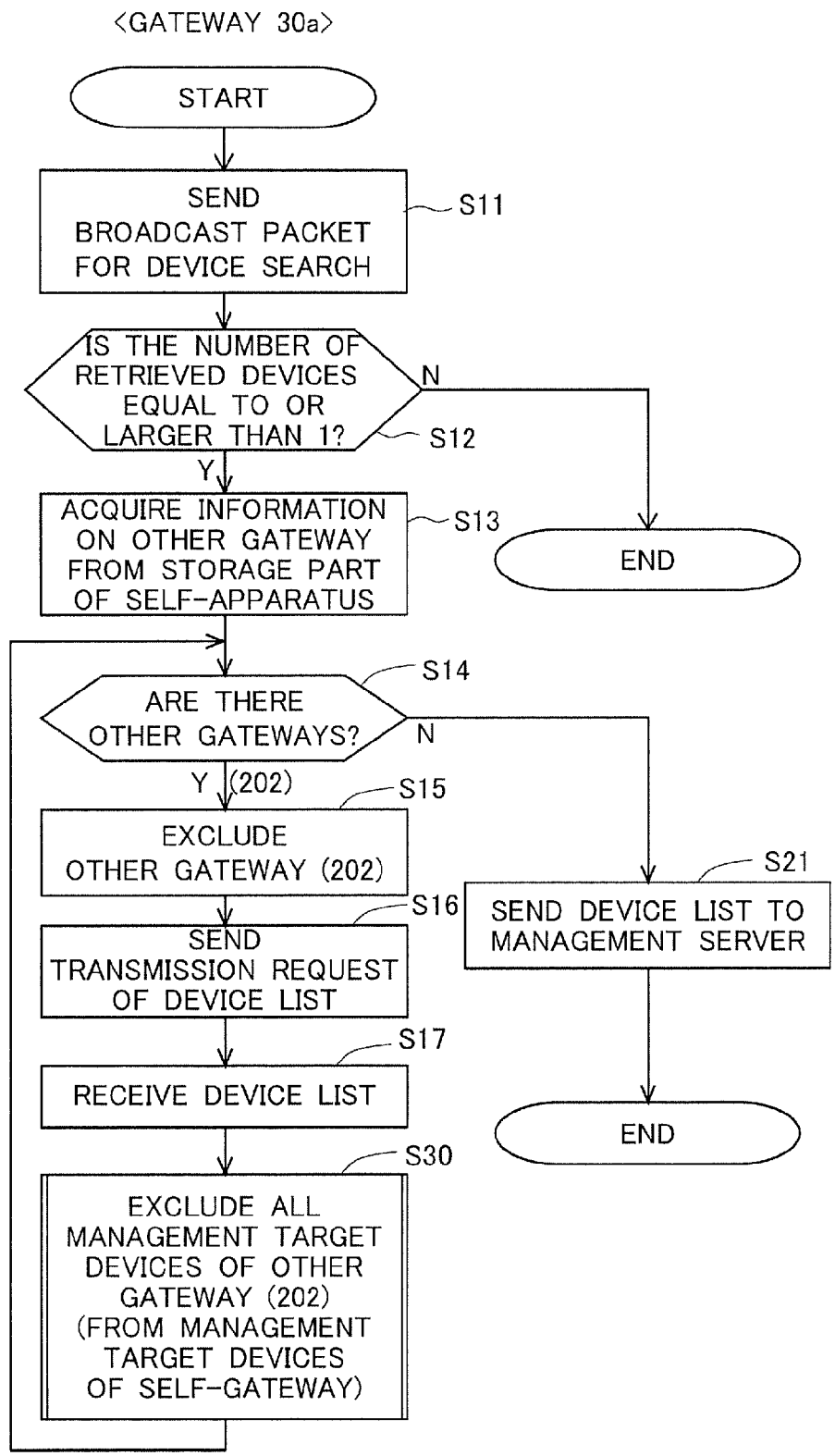
FIG. 4 is a flowchart showing an operation of a gateway in accordance with one or more embodiments.
Figure 5:
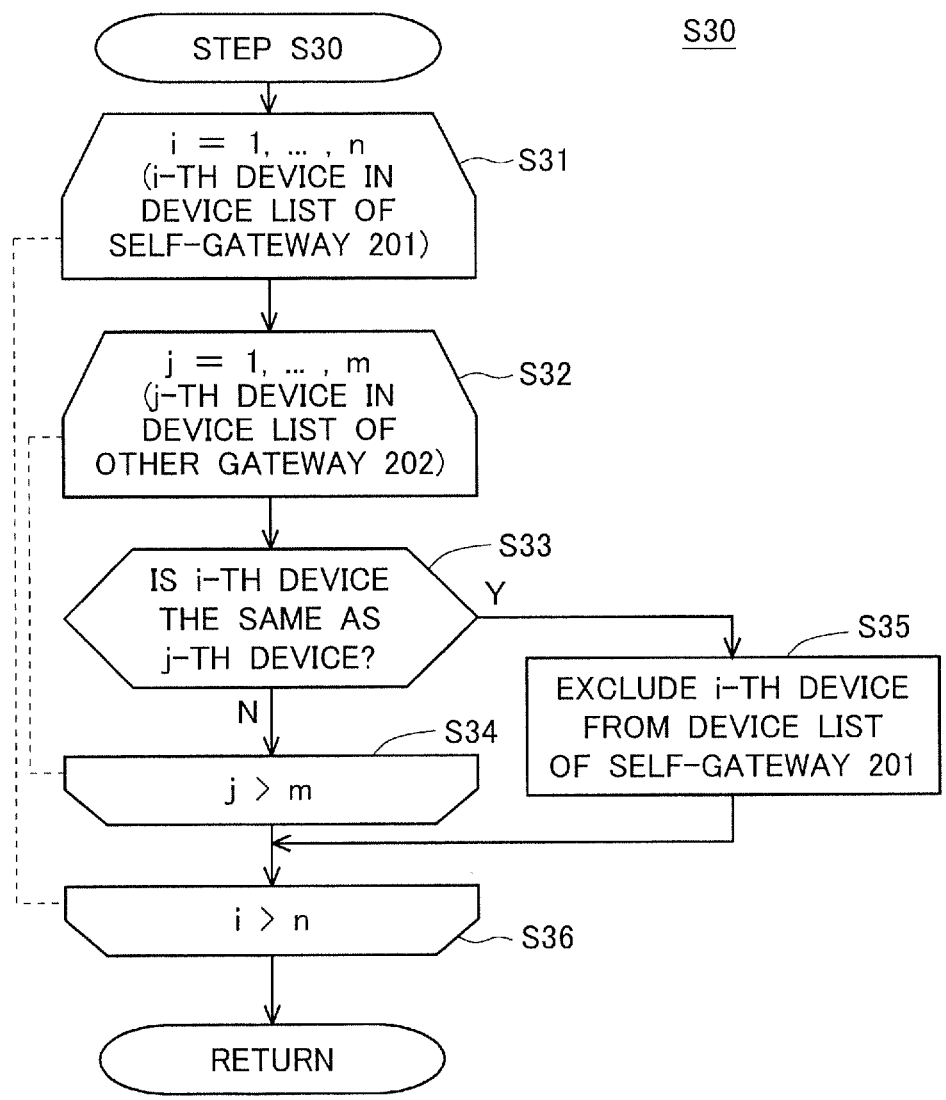
FIG. 5 is a flowchart showing a detail of part of the operation shown in FIG. 4.
Figure 6:
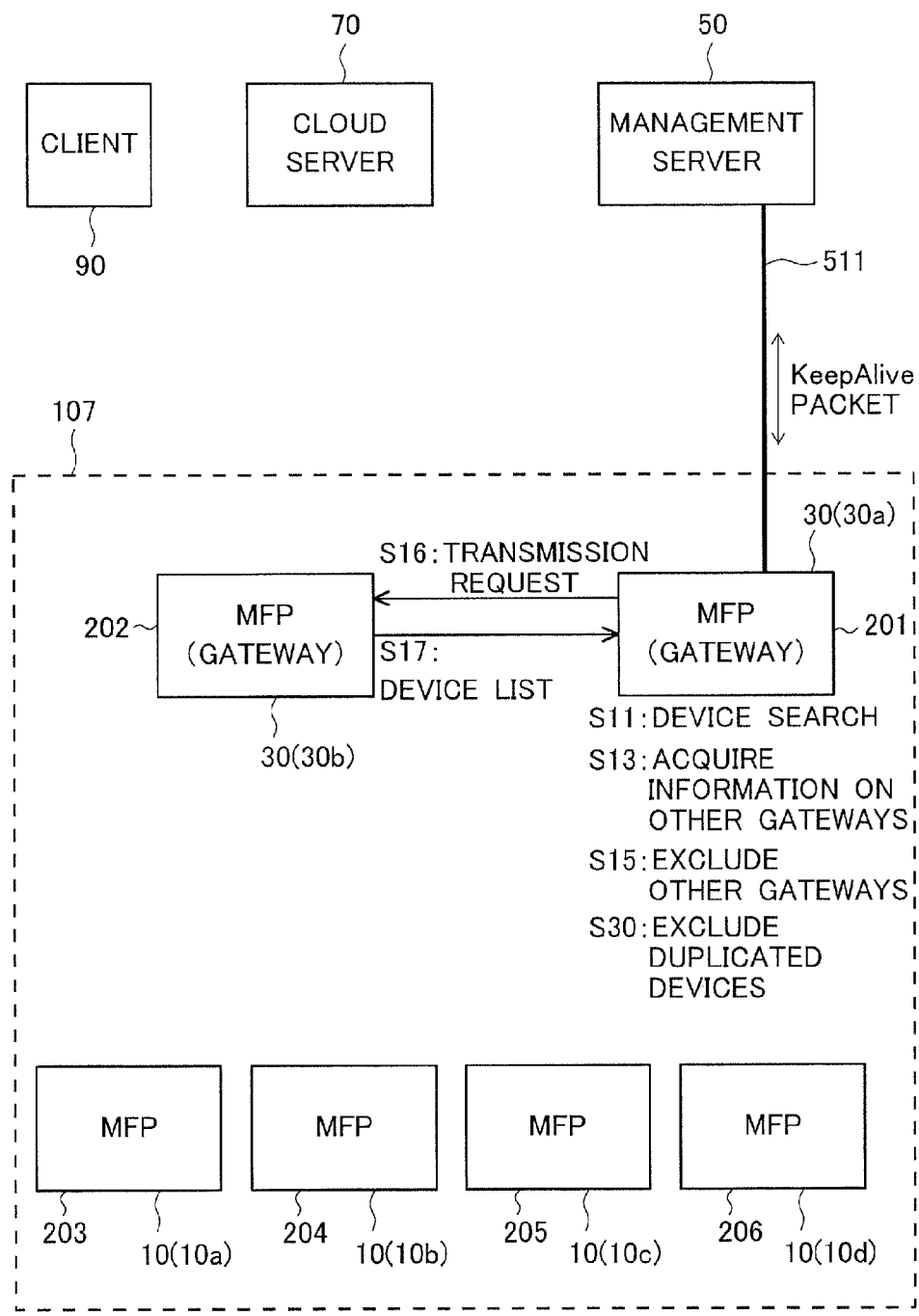
FIG. 6 is a conceptual diagram showing an operation in the communication system in accordance with one or more embodiments.

FIGS. 4 and 5 are flowcharts each showing an operation of the gateway 30 (30a in detail). FIG. 6 is a conceptual diagram showing an operation in this system 1. Hereinafter, with reference to these figures, description will be made on an operation for determining management target devices of the gateway 30a. The operation for determining the management target devices (see FIGS. 4 to 6 and the like) may be performed when a certain time comes. The operation may be performed, for example, at 9:00, 13:00, and 17:00 every day.

Figure 7:
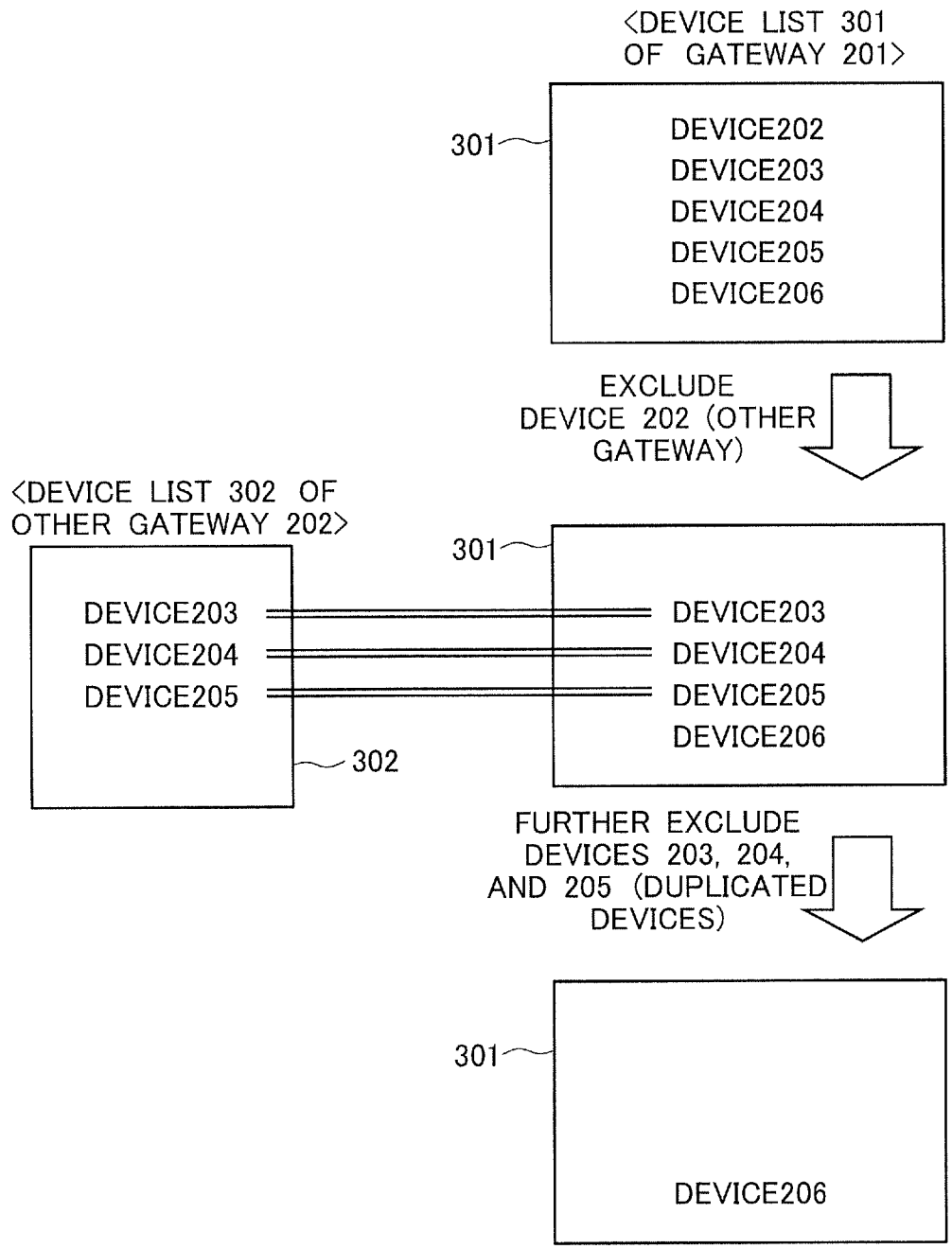
FIG. 7 is a view showing a process of generating a device list of a gateway in accordance with one or more embodiments.

In Step S11, first, the gateway 30a sends (broadcasts) a broadcast packet for device search to apparatuses inside the same LAN. The gateway 30a detects the apparatuses inside the same LAN on the basis of replies from the apparatuses. The gateway 30a lists the detected apparatuses (devices) in a device list 301. In the uppermost box of FIG. 7, shown is an exemplary device list 301 at this point in time. In the uppermost device list of FIG. 7, listed are two or more devices (herein, five devices (MFPs) 202 to 206 in total) except the self-device 201. Thus, candidate devices for the management target devices of the gateway 30a are retrieved in the device search process.

In Step S12, it is determine whether or not the number of devices which have been detected is not smaller than one (in other words, whether or not one or more devices have been detected). When no device has been detected, the process of FIG. 4 is finished. On the other hand, when at least one device has been detected, the process goes to Step S13.

In Step S13, the gateway 30a acquires information on other gateways from the storage part 5 of the self-device (30a). In the present embodiment, it is assumed that the information on other gateways existing inside the same LAN are stored in the storage part 5 of the gateway 30a in advance by a manual registration operation of an administrative user or the like. Herein, it is assumed that information indicating that another gateway 30b (MFP 202) exists is stored in the storage part 5. In Step S14, the gateway 30a determines whether or not there are other gateways existing inside the same LAN, on the basis of the information acquired in Step S13. When it is determined that there is another gateway (there are other gateways) existing inside the same LAN, the process goes to Step S15. On the other hand, it is determined that there is no other gateway existing inside the same LAN, the process goes to Step S21 and the device list 301 at that point in time is sent from the gateway 30a to the management server 50.

When the information indicating that another gateway 30b (MFP 202) exists is acquired from the storage part 5, for example, it is determined that there is another gateway 30b existing inside the same LAN, and the process goes to Step S15.

Another gateway 30b (202) is not the device placed under the control of the gateway 30a. For this reason, in Step S15, the gateway 30a first excludes the other gateway 30b (202) among the two or more devices (five devices 202 to 206 herein) which have been retrieved (detected) in the device search process of Step S11, from the device list 301. As a result, four devices 203 to 206 remain in the device list 301 (see the middle box on the right side in FIG. 7).

In next Step S16, the gateway 30a sends a transmission request of a device list 302 of the gateway 30b (202) (management device information in which the management target devices of the gateway 30b are listed) to the gateway 30b. In response to this transmission request, the gateway 30b sends back the device list 302 (see FIG. 8). In Step S17, the gateway 30a receives the device list 302 sent back from the other gateway 30b.

Figure 8:
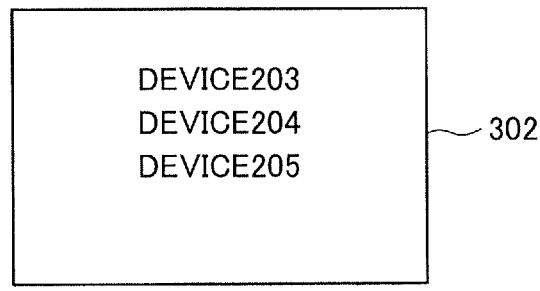
FIG. 8 is a view showing a device list of another gateway in accordance with one or more embodiments.

FIG. 8 is a view showing an exemplary device list 302 of the gateway 30b. The device list 302 of FIG. 8 indicates that three devices 203, 204, and 205 are the management target devices of the gateway 30b.

In next Step S30, on the basis of the device list 302, performed is a process of removing duplication of the management target devices of the gateway 30a and those of the gateway 30b. More in detail, all the management target devices (203, 204, and 205) (see FIG. 8) of the gateway 30b (202) are excluded from the four devices 203 to 206 (see the middle box on the right side in FIG. 7) remaining in the device list 301, on the basis of the device list 302, to thereby determine the management target device (206) of the gateway 30a (see the lowermost box in FIG. 7).

FIG. 5 is a flowchart showing a detailed operation of Step S30.

In Step S31, the gateway 30a pays attention to the i-th device (where i=1, . . . , n) remaining in the device list 301 of the self-gateway 30a (201). Herein, the value "n" is the number of remaining devices in the device list 301 ("4" in the middle box of FIG. 7). Then, a loop operation (including Steps S32 to S35) between Step S31 and Step S36 is repeated with the increment of the value "i".

Further, in Step S32, the gateway 30a pays attention to the j-th device (where j=1, . . . , m) in the device list 302 of the other gateway 30b (202). Herein, the value "m" is the number of management target devices described in the device list 302 ("3" in FIGS. 7 and 8). Then, a loop operation (including Step S33) between Step S32 and Step S34 is repeated with the increment of the value "j". In Step S33, when it is determined that the i-th device is the same device as the j-th device, the process goes to Step S35. In Step S35, the i-th device is excluded from the device list 301 of the self-gateway 30a (201), and the process goes to Step S36. For example, it is determined that the first device 203 remaining in the device list 301 is the same device as the first device 203 in the device list 302, and the first device 203 is excluded from the device list 301. The same applies to the devices 204 and 205.

Through such an operation, on the basis of the device list 302, all the management target devices (203, 204, and 205) of the gateway 30b (202) (also see FIG. 8) are excluded from the four devices 203 to 206 (see the middle box on the right side in FIG. 7) remaining in the device list 301 immediately before Step S30. Then, only the device 206 remaining in the device list 301 after this exclusion process is determined as the management target device of the gateway 30a (see the lowermost box in FIG. 7).

After that, the process goes back to Step S14. When there are still other gateways (except 30b), the process of Steps S14 to S17 and S30 is further performed. On the other hand, when there is no other gateway, the process goes to Step S21. In Step S21, the device list (updated device list) 301 after the exclusion process of Step S30 is sent to the management server 50 (Step S21). Further, the management server 50 updates the management table 69 on the basis of the updated device list 301.

Further, after that, when a printing instruction for the device 206 (10d) is given via the cloud server 70, for example, an access instruction for the device 206 is first given to the management server 50 from the cloud server 70. Next, the management server 50 specifies the gateway 30 (30a) which manages the device 206, with reference to the management table 69. Then, the management server 50 sends the tunnel connection request to the gateway 30*a* by using the message session 511 between the management server 50 and the gateway 30*a*. The gateway 30*a* establishes the tunnel communication with the cloud server 70, on the basis of the tunnel connection request. Then, the cloud server 70 accesses the device (image forming apparatus) 10 (via the gateway 30) by using the tunnel communication. Specifically, the printing instruction for the device 206 is sent from the cloud server 70 to the device 10 (206).

Herein, the communication protocol between the cloud server 70 and the gateway 30*a* is different from that between the gateway 30*a* and the specific device 10. As described above, for example, the communication protocol between the cloud server 70 and the gateway 30*a* is the HTTP (HTTPS in detail), and the communication protocol between the gateway 30*a* and the device 10 is an LPD (Line Printer Daemon) protocol. When the gateway 30*a* (the communication control part 41 and the like) receives the data for the specific device 10*d* from the cloud server 70, the gateway 30*a* converts one communication protocol (HTTPS) into another communication protocol (LPD) and also converts the data (first data) into another data (second data), and then sends the second data to the specific device 10. More specifically, when the gateway 30*a* receives the printing data (including a header part and a body part) from the cloud server 70, the gateway 30*a* removes the header part from the printing data, to thereby extract the body part (printing data body). Through such an extraction process, performed is conversion from the original data (data including the header part and the body part) into new data (data including only the body part (printing data body), not including the header part). Further, the gateway 30*a* converts the printing data body into transmission data for another communication protocol (LPD) and sends the transmission data to the specific device 10 (206).

Through the above-described operation, on the basis of the device list 302, after removing at least partial duplication of the management target devices of the gateway 30*a* and those of the gateway 30*b*, the management target devices of the gateway 30*a* are determined. Therefore, it is possible to efficiently manage a plurality of devices by a plurality of gateways.

In the above-described operation, particularly, the management target devices of the gateway 30*a* are determined, after excluding all the management target devices (203 to 205) of the gateway 30*b* from the plurality of devices 203 to 206. Thus, since the duplication of the respective management target devices of the two gateways 30*a* and 30*b* is absolutely removed, it is possible to ensure very efficient management.

More particularly, since the gateway 30*a* has only to manage relatively a small number of devices (only one device 206, not four devices 203 to 206, in the above exemplary case), it is possible to effectively use the resource of the gateway 30*a*.

2. The Second Embodiment

The second embodiment is a variation of the first embodiment. Hereinafter, description will be made, centering on the difference between the first and second embodiments.

In the above-described first embodiment, the management target device (206) of the gateway 30*a* is determined by excluding all the management target devices (203 to 205) of the other gateway 30*b* from the plurality of devices 203 to 206 listed in the device list 301. The present invention, however, is not limited to the above-described exemplary case. The management target devices of the gateway 30*a* may be determined, for example, by at least excluding some (e.g., only 203) of the management target devices 203 to 205 of the gateway 30*b* from the device list 301. At least partial duplication of the respective management target devices of the two gateways 30*a* and 30*b* may be avoided thus.

Further, though any upper limit value for the number of management target devices of each gateway 30 is not provided in the first embodiment, an upper limit value for the number of management target devices of each gateway 30 may be provided. Furthermore, within the range of the upper limit value, as many devices as possible may be managed by each gateway 30.

In the second embodiment, such an aspect will be described.

Figure 9:
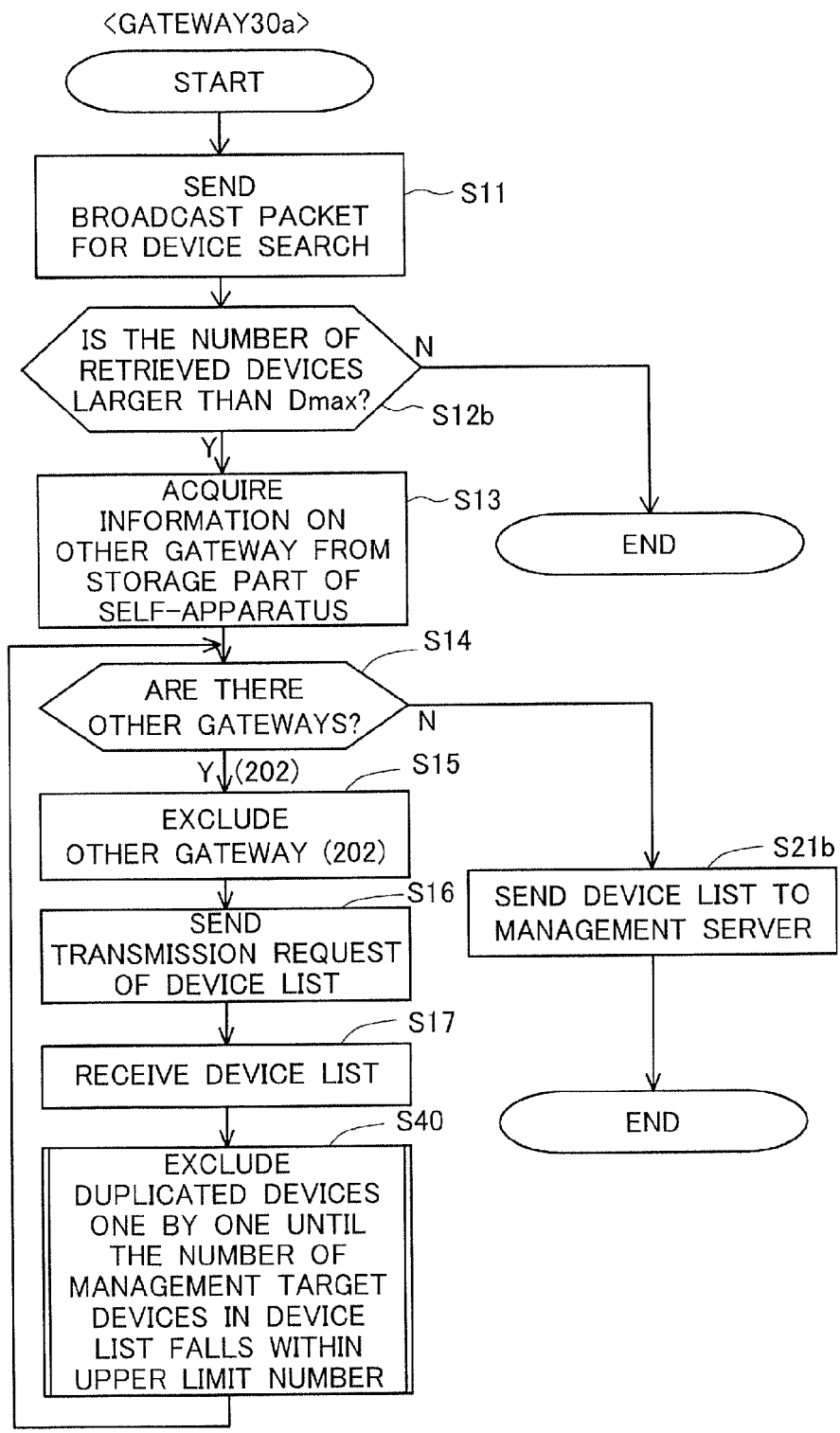
FIG. 9 is a flowchart showing an operation of a gateway in accordance with one or more embodiments.
Figure 10:
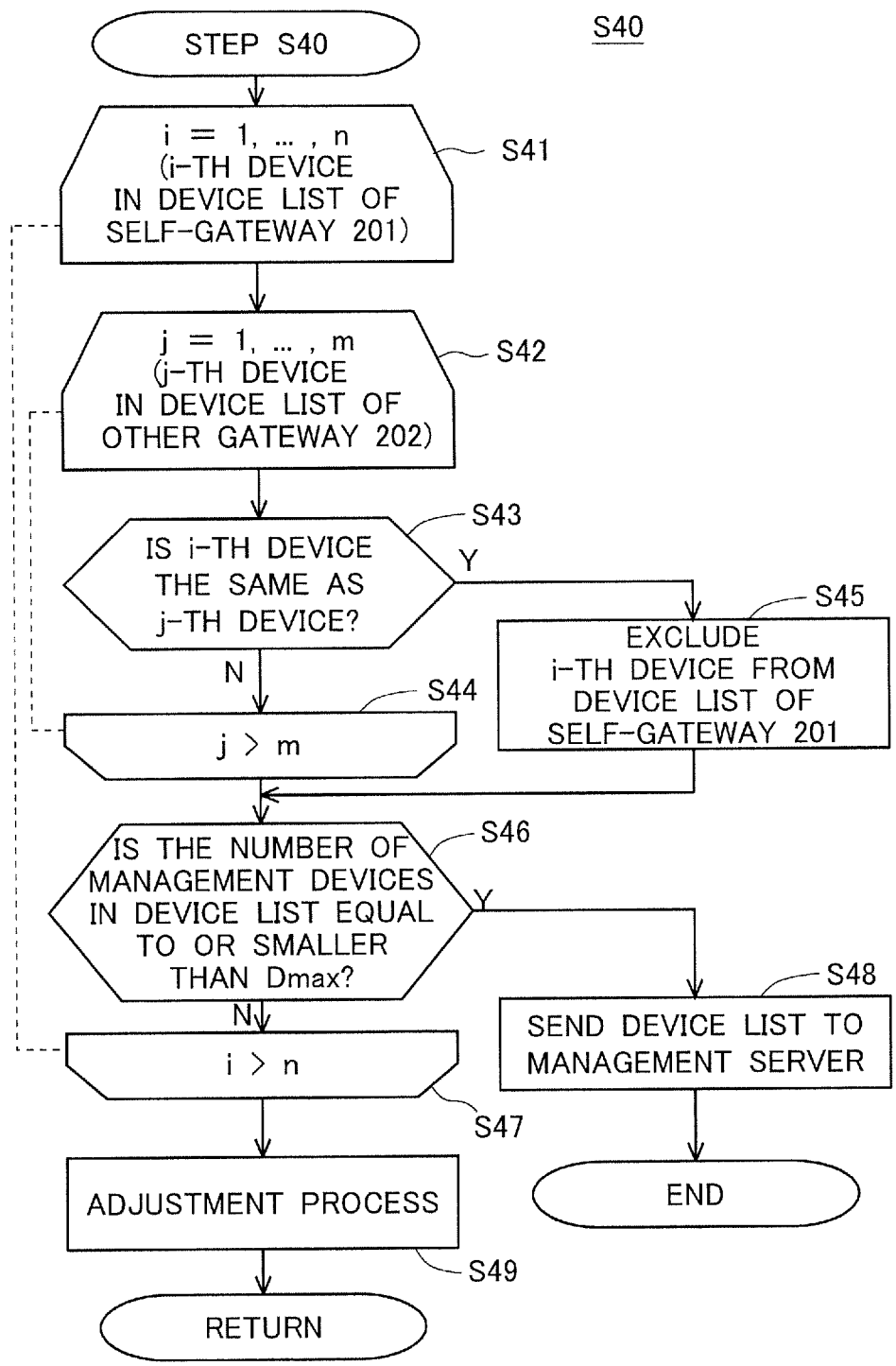
FIG. 10 is a flowchart showing a detail of part of the operation shown in FIG. 9.

FIGS. 9 and 10 are flowcharts each showing an operation of the gateway 30 (30*a*). Hereinafter, with reference to these figures, description will be made in detail on an operation for determining the management target devices of the gateway 30*a* in accordance with the second embodiment.

Figure 11:
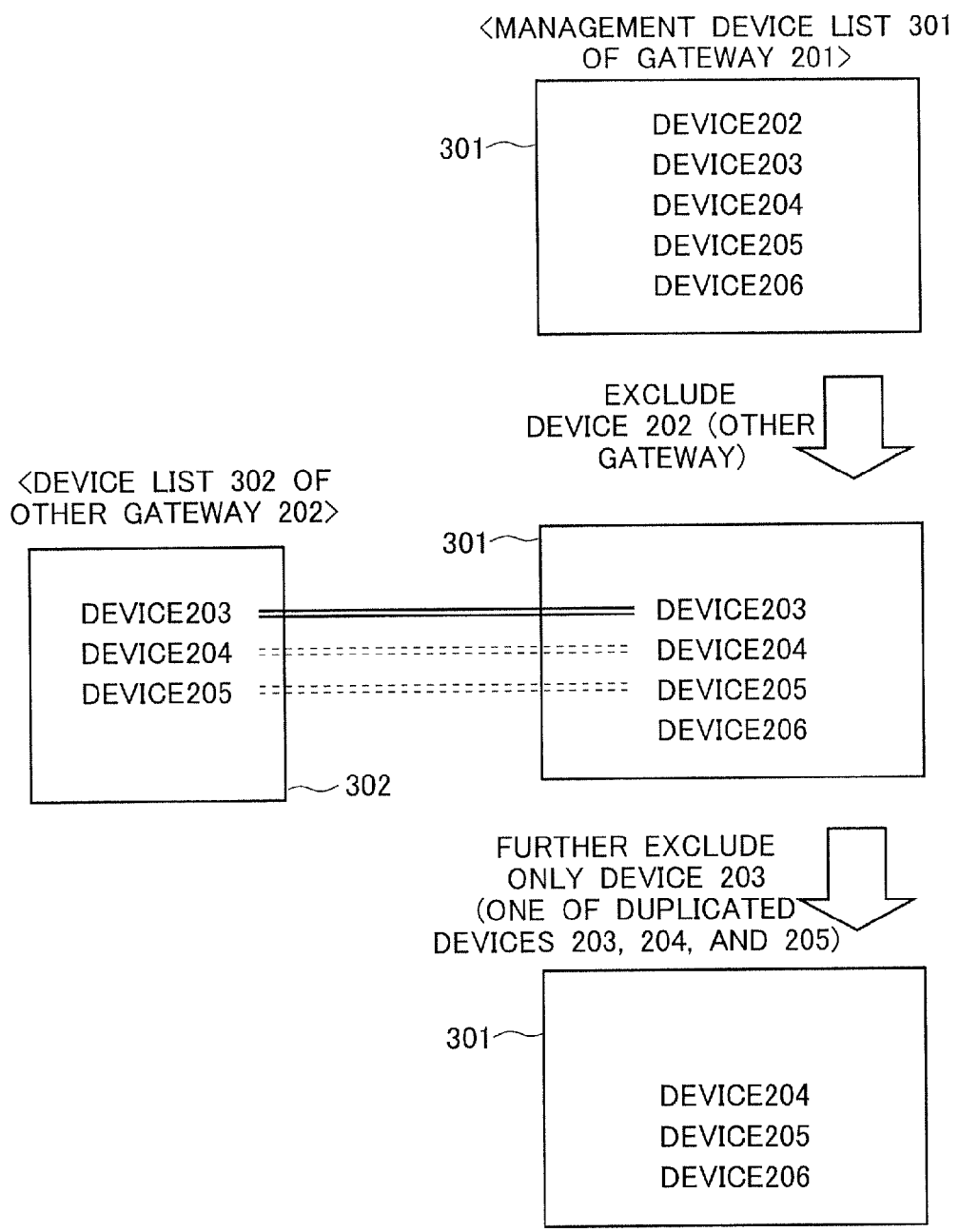
FIG. 11 is a view showing a process of generating a device list in accordance with one or more embodiments.

In Step S11, first, like in the first embodiment, in response to transmission of the broadcast packet or the like, the devices existing inside the LAN are detected and the detected apparatuses (devices) are listed in the device list 301. In the uppermost box of FIG. 11, shown is an exemplary device list 301 at this point in time. In the uppermost device list of FIG. 11, listed are five devices (MFPs) 202 to 206 in total.

In Step S12*b*, it is determine whether or not the number of devices which have been detected is larger than an upper limit value Dmax. When the number of detected devices is not larger than the upper limit value Dmax, the process of FIG. 9 is finished. On the other hand, when the number of detected devices is larger than the upper limit value Dmax, the process goes to Step S13. Further, the upper limit value Dmax is the maximum value (e.g., Dmax=3) of the number of devices which can be managed by the gateway 30*a*.

Steps S13 to S17 and S21 (S21*b*) are the same steps as those in the first embodiment. In Step S15, for example, the gateway 30*a* first excludes the other gateway 30*b* (202) among the two or more devices (five devices 202 to 206 herein) which have been retrieved (detected) in the device search process of Step S11, from the device list 301. As a result, four devices 203 to 206 remain in the device list 301 (see the middle box on the right side in FIG. 11). Further, in Step S21*b*, when the number of devices remaining in the device list 301 is still larger than the upper limit value Dmax, performed is a process (an adjustment process) in which some of the devices are deleted (excluded) by a random extraction process or the like, to thereby reduce the number of remaining devices to the upper limit value Dmax. Then, the device list 301 in which a reduced number of devices which remain after the adjustment process are described is sent from the gateway 30*a* to the management server 50.

In Step S40 subsequent to Step S17, on the basis of the device list 302 (see FIG. 8) received in Step S17, performed is a process of removing partial duplication of the management target devices of the gateway 30*a* and those of the gateway 30*b*. More in detail, an operation of excluding one management target device of the gateway 30*b* from the device list 301 is repeated until the number of devices (candidate devices) remaining in the device list 301 becomes not larger than a predetermined upper limit number. In other words, on the condition that the number of management target devices of the gateway 30*a* is not larger than the predetermined upper limit number, some of the management target devices of the gateway 30*b* are at least excluded from the device list 301, allowing partial duplication of the management target devices of the gateway 30a and those of the gateway 30b. Thus, the device list 301 is updated, and the management target devices of the gateway 30a are determined.

For example, on the basis of the device list 302, some of the management target devices (only 203) of the gateway 30b (202) are (is) excluded from the four devices 203 to 206 (see the middle box on the right side in FIG. 11) remaining in the device list 301, and the management target devices (204 o 206) of the gateway 30a are thereby determined (see the lowermost box in FIG. 11).

FIG. 10 is a flowchart showing a detailed operation of Step S40.

In Step S41, the gateway 30a pays attention to the i-th device (where i=1, . . . , n) remaining in the device list 301 of the self-gateway 30a (201). Then, a loop operation (including Steps S42 to S46) between Step S41 and Step S47 is repeated with the increment of the value "i".

Further, in Step S42, the gateway 30a pays attention to the j-th device (where j=1, . . . , m) in the device list 302 of the other gateway 30b (202). Then, a loop operation (including Step S43) between Step S42 and Step S44 is repeated with the increment of the value "j". In Step S43, when it is determined that the i-th device is the same device as the j-th device, the process goes to Step S45.

In Step S45, the i-th device is excluded from the device list 301 of the self-gateway 30a (201), and the process goes to Step S46. For example, it is determined that the first device 203 remaining in the device list 301 (see the middle box on the right side in FIG. 11) is the same device as the first device 203 in the device list 302 (see the middle box on the left side in FIG. 11, and FIG. 8), and the first device 203 is excluded from the device list 301.

In Step S46, it is determined whether or not the number of management target devices (remaining devices) in the device list 301 is not larger than the upper limit value Dmax. When the number of remaining devices is larger than the upper limit value Dmax, the loop operation is continued with the increment of the value "i" (the process goes back to Step S41). On the other hand, when the number of remaining devices is not larger than the upper limit value Dmax, the devices remaining in the device list 301 are determined as the management target devices of the gateway 30a, and the process goes to Step S48. In Step S48, the device list (updated device list) 301 after the exclusion process in Step S40 is sent to the management server 50. Further, the management server 50 updates the management table 69 on the basis of the updated device list 301. Then, the process in FIGS. 9 and 10 is completed.

In such an operation as above, for example, from the four devices 203 to 206 remaining in the device list 301 immediately before Step S40 (see the middle box on the right side in FIG. 11), some devices existing also in the device list 302 are excluded (deleted) one by one. The deletion process on the devices is repeated until the number of devices remaining in the device list 301 becomes not larger than the predetermined upper limit value Dmax. In other words, if the number of devices remaining in the device list 301 is not larger than the predetermined upper limit value Dmax, duplication of the respective management target devices among a plurality of device lists 301 and 302 (a plurality of gateways 30a and 30b) is allowed. Then, the three devices 204, 205, and 206 remaining in the device list 301 after the exclusion process are determined as the management target devices of the gateway 30a (see the lowermost box in FIG. 11).

Through the above-described operation, on the basis of the device list 302, by at least excluding some of the management target devices of the gateway 30b from the two or more devices retrieved in the device search process (Step S11), the management target devices of the gateway 30a are determined. In other words, after removing at least partial duplication of the management target devices of the gateway 30a and those of the gateway 30b, the management target devices of the gateway 30a are determined. More in detail, by excluding some (203) of the management target devices of the gateway 30b from the four devices 203 to 206, the management target devices (204, 205, and 206) of the gateway 30a are determined. Therefore, it is possible to efficiently manage a plurality of devices by a plurality of gateways.

Further, in the second embodiment, since the upper limit value of the number of management target devices is provided for each gateway 30, it is possible to prevent depletion of the resource (in particular, memory resource) of each gateway 30 and ensure stabilization of the operation of the gateway 30 (apparatus 30 as the image forming apparatus).

Furthermore, until the number of remaining devices after excluding at least one of the two or more devices retrieved in the device search process becomes not larger than the predetermined upper limit number, the operation of excluding the management target devices of the gateway 30b one by one from the two or more devices is repeated. At that time, on the condition that the number of management devices in the device list 301 is reduced to not larger than the upper limit value Dmax, duplication of the respective management target devices among a plurality of device lists 301 and 302 (a plurality of gateways 30a and 30b) is allowed. In other words, the management target devices of the gateway 30a are determined by at least excluding some of the management target devices of the gateway 30b from the device list 301, allowing partial duplication of the management target devices of the gateway 30a and those of the gateway 30b, on the condition that the number of management target devices of the gateway 30a is not larger than the predetermined upper limit number. It is thereby possible to avoid exceeding the limit of the resource in the gateway 30 by preventing the number of management devices from exceeding the upper limit value Dmax and achieve a relatively flexible management with redundancy ensured to some degree.

The gateway 30a removes at least part of duplication of the management target devices among a plurality of device lists 301 and 302 (a plurality of gateways 30a and 30b), under the condition that the number of management target devices thereof should be not larger than the upper limit value Dmax. Therefore, instead of the excluded devices (203 and the like), the gateway 30a can (newly) manage the other devices (206 and the like). Further, since the gateway 30a places as many devices as possible under the control thereof while controlling the number of management target devices thereof to be not larger than the upper limit value Dmax, a relatively large number of devices can be managed by one of the plurality of gateways 30 (30a, 30b). For example, it is possible to manage the three devices 203, 204, and 205 by the gateway 30b and manage the three devices 204, 205, and 206 by the gateway 30a. In other words, it is possible to manage four different devices in total by the two gateways 30 (30a, 30b).

After the loop operation of Steps S41 to S47 is finished, the process goes to Step S49. More in detail, even if the loop operation of Steps S41 to S47 until the n-th device is finished, when the number of devices remaining in the device list 301 is still larger than the upper limit value Dmax, the adjustment process is performed in Step S49. In the adjustment process, a predetermined number (upper limit value Dmax) of devices are extracted as appropriate (for example, randomly extracted) from the devices remaining in the device list 301, to thereby complete the final device list 301 (see FIG. 12 (described later)).

Figure 12:
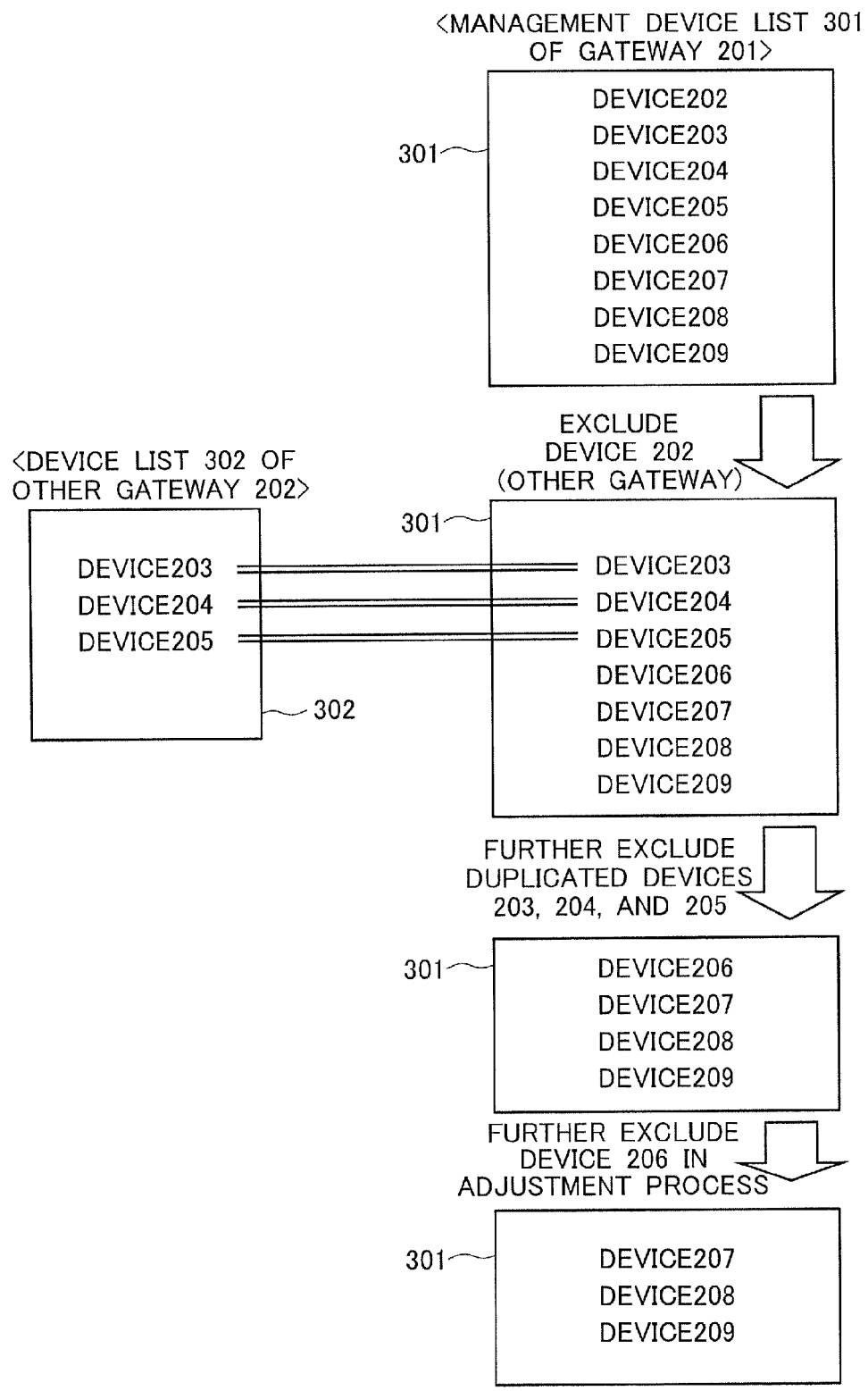
FIG. 12 is a view showing a process of generating another device list in accordance with one or more embodiments.

FIG. 12 is a view showing another example of the device list 301. FIG. 12 shows a manner in which the device list 301 of the gateway 30a is generated when nine MFPs (devices) 201 to 209 exist inside the same LAN.

In the uppermost box of FIG. 12, first, eight devices 202 to 209 which are retrieved in the device search process (Step S11) by the gateway 30a (201) are described in the device list 301.

Further, in the second box (on the right side) from the top of FIG. 12, shown is a state where the other gateway 30b (202) has been excluded from the device list 301 (Step S15).

After that, in Step S40 (particularly, in Step S45), the three devices 203, 204, and 205 which are duplicated among the device lists 301 and 302 are excluded (one by one) from the device list 301. In the third box from the top of FIG. 12, shown is a state where the three devices 203, 204, and 205 which are duplicated among the device lists 301 and 302 have been excluded.

Further, an upper limit number (Dmax) of devices are determined as the remaining devices from the four devices 206, 207, 208, and 209 remaining in the device list 301. For example, as shown in the lowermost box (the fourth box from the top) of FIG. 12, as a result of the random extraction process or the like, the three (=Dmax) devices 207, 208, and 209 are determined as the remaining devices. In other words, one device (the device 206 herein), the number of which is obtained by subtracting the upper limit value Dmax ("3") from the number ("4") of devices remaining in the device list 301, is excluded from the device list 301. In the lowermost box of FIG. 12, shown is the result of the adjustment process (in Step S49). Thus, when the number of devices remaining in the device list 301 is still larger than the upper limit value Dmax, performed is an operation in which the number of remaining devices is reduced to the upper limit value Dmax by deleting (excluding) some (206) of the devices in the random extraction process or the like.

Through this operation, particularly, the gateway 30a removes at least part (all in FIG. 12) of duplication of the management target devices among the plurality of device lists 301 and 302 (among the plurality of gateways 30a and 30b), under the condition that the number of management target devices thereof should be not larger than the upper limit value Dmax. Therefore, instead of the excluded three devices 203, 204, and 205, the gateway 30a can (newly) manage the other devices 207, 208, and 209.

Further, since the gateway 30a places as many devices as possible under the control thereof while controlling the number of management devices in the device list 301 to be not larger than the upper limit value Dmax, a relatively large number of devices can be managed by one of the plurality of gateways 30. For example, it is possible to manage the three devices 203, 204, and 205 by the gateway 30b and manage the three devices 207, 208, and 209 by the gateway 30a. In other words, it is possible to manage six different devices in total by the two gateways 30.

Furthermore, though the process of FIG. 9 is immediately finished when it is determined that the number of detected devices is not larger than the upper limit value Dmax in Step S12b (FIG. 9) of the above-described second embodiment, the present invention is not limited to this exemplary case.

When it is determined in Step S12b that the number of devices detected in Step S11 is not larger than the upper limit value Dmax, the same operation as that in Step S21 may be performed subsequent to Step S12b. In this case, after performing an update process in which the other gateway 30 (30b) is excluded from the device list 301, the device list 301 after the update process may be sent to the management server 50.

3. The Third Embodiment

The third embodiment is a variation of the first embodiment.

In the third embodiment, the process of determining the management target devices of the gateway 30b (the process of generating the device list 301) is the same as that in the first embodiment.

In the third embodiment, however, a device during sleep is detected on the basis of a result of a device detection process by one gateway 30a, and the device during sleep is excluded from the device list 302 of the other gateway 30b. More in detail, among the devices listed in the device list 302, the device which is not retrieved in the device search process by the gateway 30a is excluded (deleted) from the management target devices (the device list 302) of the gateway 30b. Such an aspect will be described below.

Figure 13:
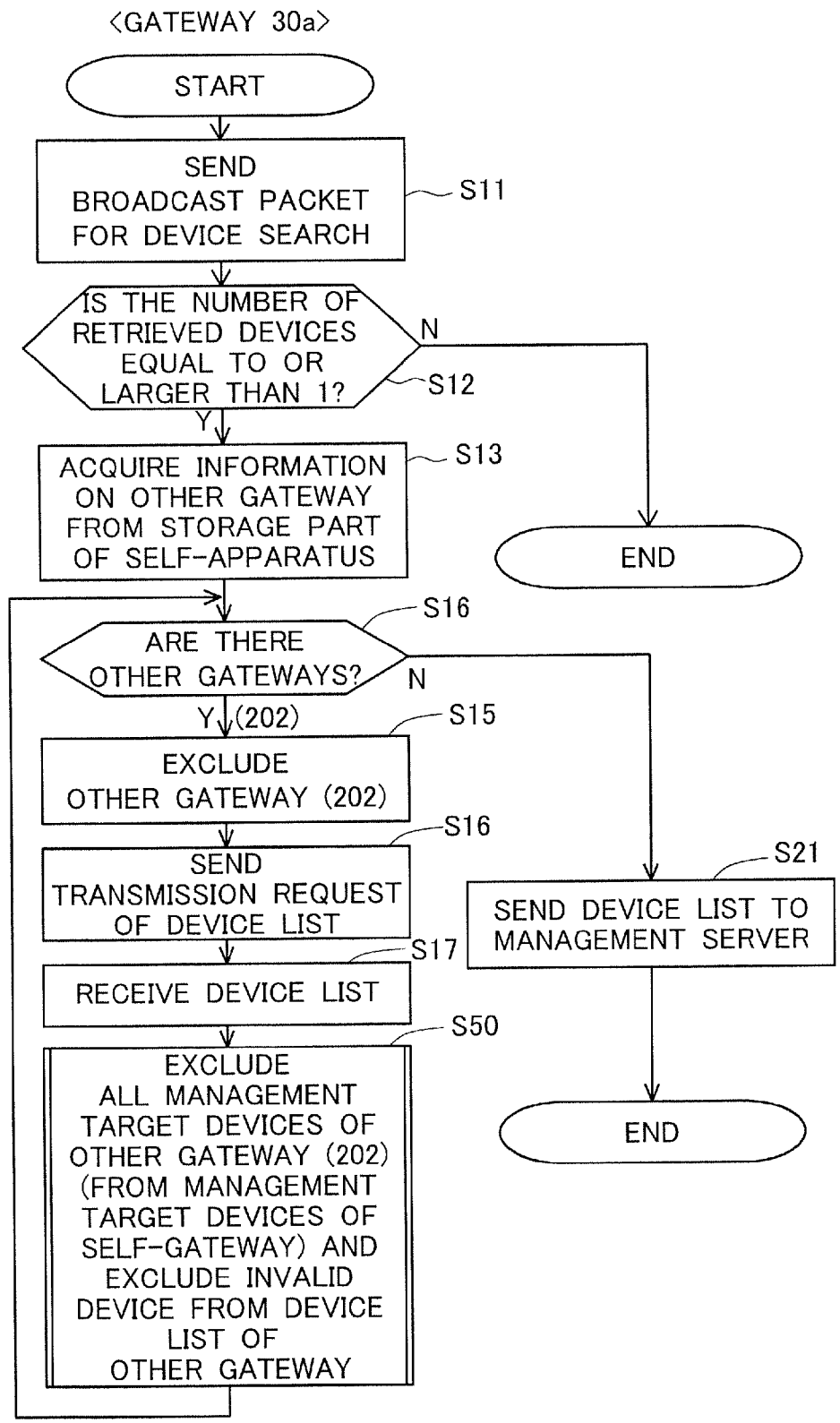
FIG. 13 is a flowchart showing an operation of a gateway in accordance with one or more embodiments.
Figure 14:
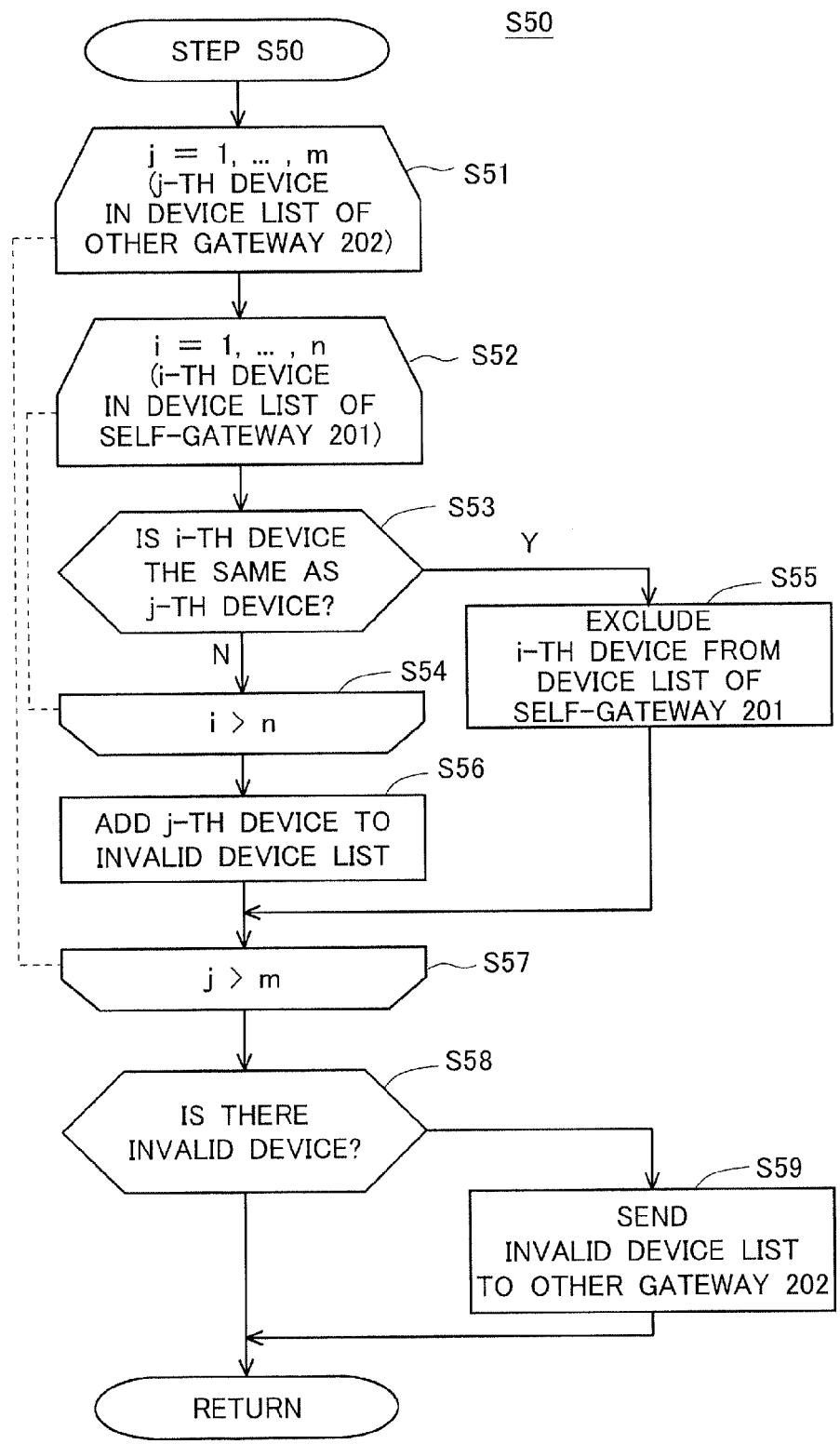
FIG. 14 is a flowchart showing a detail of part of the operation shown in FIG. 13.

FIGS. 13 and 14 are flowcharts each showing an operation of the gateway 30 (30a). Hereinafter, with reference to these figures, description will be made on an operation for determining the management target devices of the gateway 30a and an operation for changing the management target devices of the gateway 30b in accordance with the third embodiment.

In Steps S11 to S17 and S21, first, the same operations as those in the first embodiment are performed.

In Step S50 subsequent to Step S17, on the basis of the device list 302 (see FIG. 8) received in Step S17, performed is a process of removing at least partial duplication of the management target devices of the gateway 30a and those of the gateway 30b.

FIG. 14 is a flowchart showing a detailed operation of Step S50.

In Step S50 (particularly, see Steps S51 and S52), contrary to the first embodiment, a loop operation is performed, centering on the devices listed in the device list 302 of the gateway 30b. Specifically, a loop operation on the devices (the j-th device) listed in the device list 302 is performed as an outer loop operation, and a loop operation on the devices (the i-th device) listed in the device list 301 is performed as an inner loop operation.

Specifically, in Step S51, the gateway 30a pays attention to the j-th device (where j=1, . . . , m) in the device list 302 of the other gateway 30b (202). Then, a loop operation (including Steps S52 to S56) between Step S51 and Step S57 is repeated with the increment of the value "j".

Further, in Step S52, the gateway 30a pays attention to the i-th device (where i=1, . . . , n) remaining in the device list 301 of the self-gateway 30a (201). Then, a loop operation (including Step S53) between Step S52 and Step S54 is repeated with the increment of the value "i". In Step S53, when it is determined that the i-th device is the same device as the j-th device, the process goes to Step S55.

In Step S55, the i-th device is excluded from the device list 301 of the self-gateway 30a (201), and the process goes to Step S57. For example, like in the first embodiment, it is determined that the first device 203 remaining in the device list 301 is the same device as the first device 203 in the device list 302, and the first device 203 is excluded from the device list 301. Further, the devices 204 and 205 are excluded, like in the first embodiment.

Furthermore, when the j-th device in the device list 302 does not coincide with any device (i-th device) in the device list 301, the gateway 30*a* determines that the j-th device is "a device in not-operation (during sleep or during power-off)" (invalid device). Herein, in the device search process of Step S11, the devices in operation are listed in the device list 301. Nevertheless, considering that the j-th device in the device list 302 does not coincide with any device in the device list 301, it can be determined that the j-th device is not operating. Then, in Step S56, the gateway 30*a* adds the j-th device to an invalid device list.

Figure 15:
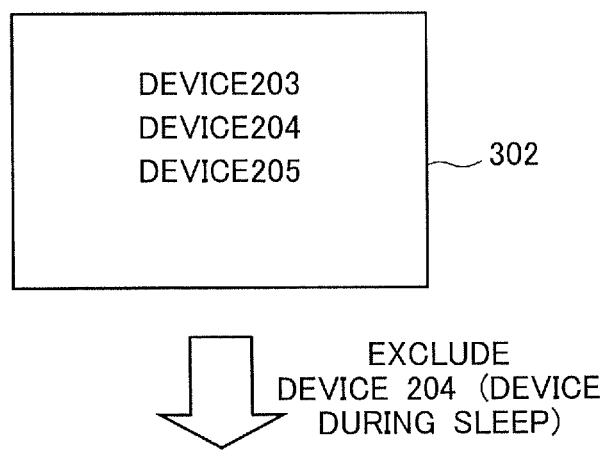
FIG. 15 is a view showing a manner in which a device list of another gateway is changed in accordance with one or more embodiments.
Figure 15:
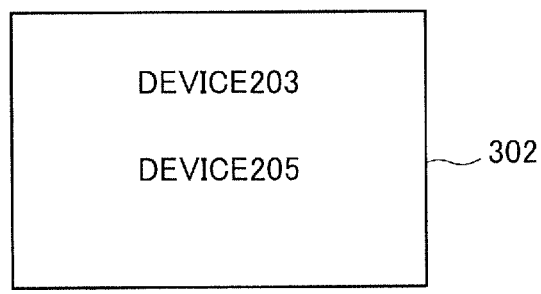

Then, after it is determined whether each of the devices in the device list 302 is an invalid device or not, when it is determined in Step S58 that at least one invalid device exists, the process goes to Step S59. After that, in Step S59, the invalid device list in which invalid devices are listed is sent from the gateway 30*a* to the other gateway 30*b*. The gateway 30*b* excludes the devices (invalid devices) listed in the invalid device list from the management target devices of the self-apparatus 30*b*. For example, when it is described in the invalid device list that the device 204 is an invalid device, as shown in FIG. 15, the device 204 is excluded from the device list 302 of the gateway 30*b* (202).

Thus, in Step S59, notification that a device which is included in the device list 302 and has not been retrieved in the device search process (Step S11) should be excluded from the management target devices of the gateway 30*b* is given from the gateway 30*a* to the gateway 30*b*.

Through the above-described operation, since the invalid device which has not been retrieved in the device search process (Step S11) is deleted from the device list 302 of the other gateway 30*b*, it is possible to effectively use the resource of the gateway 30*b*. Further, the same effects as those in the first embodiment can be produced.

Though the aspect in which the idea in accordance with the third embodiment is applied to the first embodiment has been shown herein, the present invention is not limited to this exemplary case, but the idea in accordance with the third embodiment may be applied to the second embodiment.

Further, in the third embodiment, the gateway 30*b* can add another device (e.g., the device 207) as the management target device, instead of the invalid device 204. Particularly, in the case where the upper limit value is provided for the number of management target devices of the gateway 30*b*, the invalid device (the management target device during sleep or the like) may be excluded from the management target devices of the gateway 30*b* and instead of the invalid device, another device should be added to the management target devices thereof. It is thereby possible to manage a relatively large number of devices by one of the plurality of gateways 30.

<4. Variations>

Though one or more embodiments of the present invention have been described above, the present invention is not limited to the above-described exemplary cases.

For example, though the gateway 30*a* acquires the information on the other gateway 30*b* from the storage part 5 of the self-apparatus in Step S13 in the above-described embodiments, this is only one exemplary case, and the gateway 30*a* may inquire the information on the other gateway 30*b*, of the management server 50.

Figure 16:
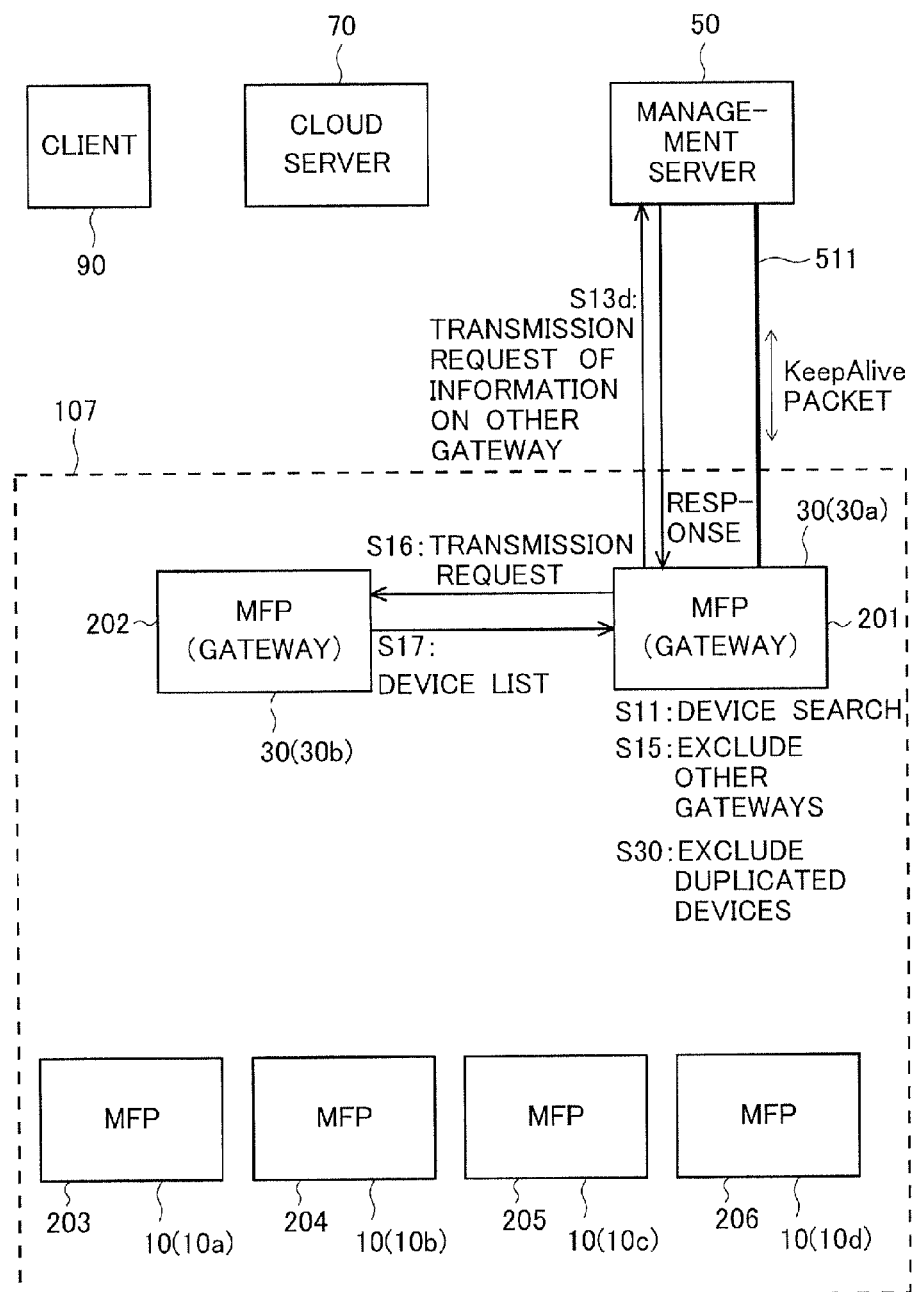
FIG. 16 is a conceptual diagram showing an operation of a system in accordance with one or more embodiments.
Figure 17:
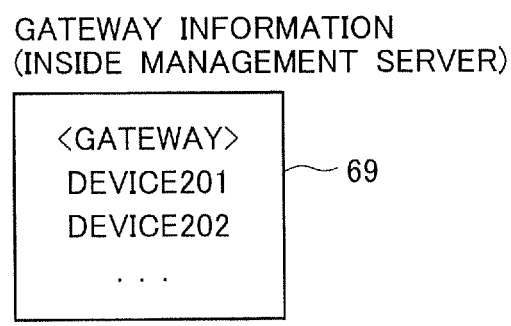
FIG. 17 is a view showing a management table in accordance with one or more embodiments.

More in detail, in Step S13 (S13*d*), the gateway 30*a* sends a transmission request of the information on the other gateway 30 to the management server 50 (FIG. 16). In response to the transmission request, the management server 50 acquires the information on the gateway other than the gateway 30*a* (the information indicating that the device 202 (30*b*) is a gateway, or the like) on the basis of the management table 69 (see FIG. 17) stored in the self-apparatus 50, and sends the information to the gateway 30*a*. Then, the gateway 30*a* may acquire the information on the other gateway 30*b* (the information indicating that the device 202 is a gateway) by receiving the information sent back from the management server 50 in response to the transmission request.

Figure 18:
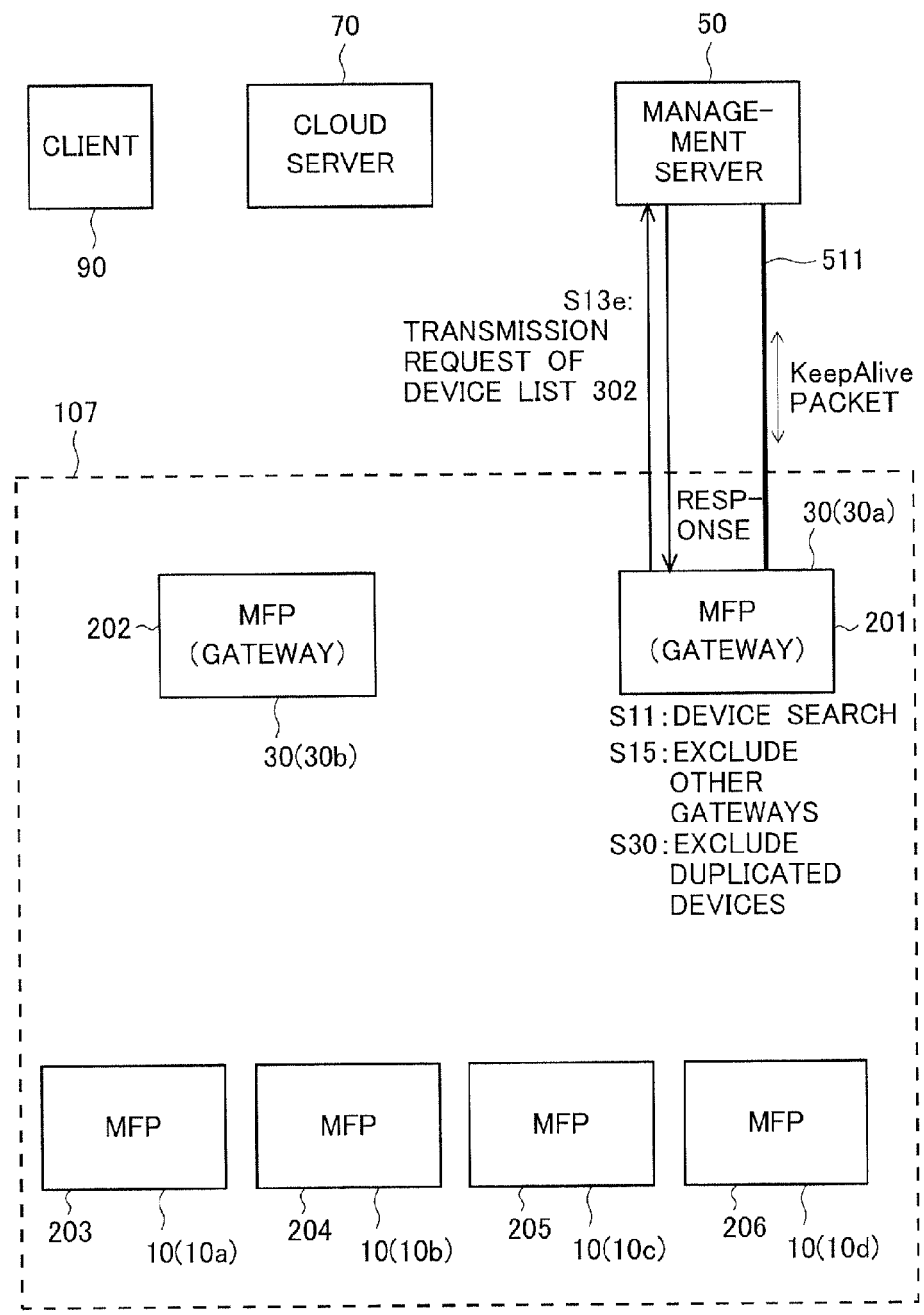
FIG. 18 is a conceptual diagram showing an operation of a system in accordance with one or more embodiments.

Further, in the above-described embodiments, the transmission request of the device list 302 is sent from the gateway 30*a* to the gateway 30*b* in Step S16. Then, in Step S17, the gateway 30*a* acquires the information (management device information) on the management target devices of the gateway 30*b* by receiving the information sent back from the gateway 30*b* in response to the transmission request. The present invention, however, is not limited to this exemplary case. For example, in Step S13 (Step S13*e*) (see FIG. 18), the gateway 30*a* may send the transmission request of the device list (302 and the like) of the other gateways (30*b* and the like) to the management server 50. Then, the gateway 30*a* may acquire the device list 300 (management device information) of each gateway 30 by receiving the information sent back in response to the transmission request.

Furthermore, though the aspect in which the operation of determining the management target devices of each gateway 30 is performed when a certain time comes has been shown in the above-described embodiments, this is only one exemplary case. For example, instead of this aspect or together with this aspect, the determination operation may be performed at the start-up of each gateway 30.

Further, though the cloud server (external server) 70 and the management server 50 are provided as different apparatuses in the above-described embodiments, this is only one exemplary case. For example, the cloud server (external server) 70 and the management server 50 may be provided inside the same apparatus (casing).

Furthermore, though the MFP is shown as an example of the device 10 in the above-described embodiments, this is only one exemplary case. For example, the device may be an image forming apparatus or the like which performs at least one of a printing operation and an image reading operation (scanning operation). More in detail, the device 10 may be a single-function printer, a single-function scanner, or the like.

Further, the gateway 30 is not limited to an MFP. The gateway 30 may be, for example, an apparatus having the same function as one of various devices other than the MFP has. The gateway may be an apparatus not having the function as the image forming apparatus.

While the invention has been shown and described in detail, the foregoing description is in all aspects illustrative and not restrictive. It is therefore understood that numerous modifications and variations can be devised without departing from the scope of the invention. Accordingly, the scope of the invention should be limited only by the attached claims.

What is claimed is:
1. A communication system comprising:
a plurality of devices provided inside a LAN; and
a plurality of communication relay apparatuses provided inside the LAN and that relay communication between the plurality of devices and an external server provided outside the LAN, wherein the plurality of communication relay apparatuses comprises a first communication relay apparatus and a second communication relay apparatus, the first communication relay apparatus comprises:
- a search processor that performs a device search process of searching the LAN for a device;
- an acquisition processor that acquires information on at least one first management target device which is a device whose communication relay process with the external server is managed by the second communication relay apparatus; and
- a determination processor that determines at least one second management target device which is a device whose communication relay process with the external server is managed by the first communication relay apparatus, the determination processor determines the at least one second management target device after removing at least partial duplication of the at least one second management target device and the at least one first management target device, by excluding at least some of the at least one first management target device from two or more devices which are retrieved in the device search process, on the basis of the two or more devices and management device information which is the information on the at least one first management target device, and the first communication relay apparatus compiles a device list that lists the at least one second management target device based on the determination by the determination processor.

2. The communication system according to claim 1, wherein the determination processor determines the at least one second management target device by at least excluding all of the at least one first management target device from the two or more devices.

3. The communication system according to claim 1, wherein the determination processor determines the at least one second management target device by at least excluding some of the at least one first management target device from the two or more devices.

4. The communication system according to claim 3, wherein the determination processor determines the at least one second management target device by at least excluding some of the at least one first management target device from the two or more devices, allowing partial duplication of the at least one second management target device and the at least one first management target device, on the condition that a number of the at least one second management target device is not larger than a predetermined upper limit number.

5. The communication system according to claim 1, wherein the determination processor notifies the second communication relay apparatus that a device which is included in the management device information and is not retrieved in the device search process should be excluded from at least one management target device of the second communication relay apparatus.

6. The communication system according to claim 1, further comprising:
- a management server provided outside the LAN, receiving an access request for a specific device among the plurality of devices from the external server, wherein the first communication relay apparatus sends information on the at least one second management target device to the management server, the management server comprises:
- a storage that stores therein registration information of at least one management target device of each of the plurality of communication relay apparatuses, the registration information including information on at least one management target device of the first communication relay apparatus;
- a relay apparatus determination processor that determines a communication relay apparatus which is capable of relaying communication with the specific device on the basis of the registration information when the access request for the specific device is received from the external server; and
- a communication processor that sends a tunnel connection request to the communication relay apparatus that is determined by the relay apparatus determination part, the tunnel connection request indicating that a tunnel connection with the external server should be established, and wherein the communication relay apparatus determined by the relay apparatus determination processor establishes the tunnel connection with the external server in response to the tunnel connection request, and relays communication between the external server and the specific device by using the tunnel connection.

7. The communication system according to claim 6, wherein
the communication processor of the management server establishes a communication session with the first communication relay apparatus in advance, and
sends the tunnel connection request to the first communication relay apparatus by using the communication session when the first communication relay apparatus is determined as a communication relay apparatus for the specific device by the relay apparatus determination processor.

8. The communication system according to claim 6, wherein
the first communication relay apparatus performs communication between the first communication relay apparatus and the external server with a first communication protocol,
the first communication relay apparatus performs communication between the first communication relay apparatus and the specific device with a second communication protocol, and
when the first communication relay apparatus receives first data for the specific device from the external server, the first communication relay apparatus converts the first data into second data with conversion of the first communication protocol into the second communication protocol, and sends the second data to the specific device.

9. The communication system according to claim 6, wherein the acquisition processor acquires the management device information by sending a transmission request of the management device information to the management server and receiving information sent from the management server in response to the transmission request.

10. The communication system according to claim 6, wherein the external server and the management server are provided inside the same apparatus.

11. The communication system according to claim 1, wherein the acquisition processor acquires the management device information by sending a transmission request of the management device information to the second communication relay apparatus and receiving information sent from the second communication relay apparatus in response to the transmission request.

12. A communication relay apparatus which is one communication relay apparatus among a plurality of communication relay apparatuses which relay communication between an external server provided outside a LAN and a plurality of devices provided inside the LAN, comprising:
a search processor that performs a device search process of searching the LAN for a device;
an acquisition processor that acquires information on at least one first management target device which is a device whose communication relay process with the external server is managed by a second communication relay apparatus which is a communication relay apparatus other than the one communication relay apparatus among the plurality of communication relay apparatuses provided inside the LAN; and
a determination processor that determines at least one second management target device which is a device whose communication relay process with the external server is managed by a first communication relay apparatus which is the one communication relay apparatus among the plurality of communication relay apparatuses,
wherein the determination processor determines the at least one second management target device after removing at least partial duplication of the at least one second management target device and the at least one first management target device, by excluding at least some of the at least one first management target device from two or more devices which are retrieved in the device search process, on the basis of the two or more devices and management device information which is the information on the at least one first management target device, and
the first communication relay apparatus compiles a device list that lists the at least one second management target device based on the determination by the determination processor.

13. The communication relay apparatus according to claim 12, wherein the determination processor determines the at least one second management target device by at least excluding all of the at least one first management target device from the two or more devices.

14. The communication relay apparatus according to claim 12, wherein the determination processor determines the at least one second management target device by at least excluding some of the at least one first management target device from the two or more devices.

15. The communication relay apparatus according to claim 14, wherein the determination processor determines the at least one second management target device by at least excluding some of the at least one first management target device from the two or more devices, allowing partial duplication of the at least one second management target device and the at least one first management target device, on the condition that a number of the at least one second management target device is not larger than a predetermined upper limit number.

16. The communication relay apparatus according to claim 12, wherein the determination processor notifies the second communication relay apparatus that a device which is included in the management device information and is not retrieved in the device search process should be excluded from at least one management target device of the second communication relay apparatus.

17. The communication relay apparatus according to claim 12, wherein the acquisition processor acquires the management device information by sending a transmission request of the management device information to the second communication relay apparatus and receiving information sent from the second communication relay apparatus in response to the transmission request.

18. The communication relay apparatus according to claim 12, wherein the acquisition processor acquires the management device information by sending a transmission request of the management device information to a management server provided outside the LAN and receiving information sent from the management server in response to the transmission request.

19. The communication relay apparatus according to claim 12, wherein the first communication relay apparatus is an image forming apparatus.

20. A non-transitory computer-readable recording medium for recording therein a program to be executed by a computer embedded in one communication relay apparatus among a plurality of communication relay apparatuses which relay communication between an external server provided outside a LAN and a plurality of devices provided inside the LAN, to cause the computer to perform:
a) performing a device search process of searching the LAN for a device;
b) acquiring information on at least one first management target device which is a device whose communication relay process with the external server is managed by a second communication relay apparatus which is a communication relay apparatus other than the one communication relay apparatus among the plurality of communication relay apparatuses provided inside the LAN; and
c) determining at least one second management target device which is a device whose communication relay process with the external server is managed by a first communication relay apparatus which is the one communication relay apparatus among the plurality of communication relay apparatuses,
wherein the at least one second management target device is determined in the step c) after removing at least partial duplication of the at least one second management target device and the at least one first management target device, by excluding at least some of the at least one first management target device from two or more devices which are retrieved in the device search process in the step a), on the basis of the two or more devices and management device information which is the information acquired in the step b), and
the first communication relay apparatus compiles a device list that lists the at least one second management target device based on the determination.

21. The non-transitory computer-readable recording medium according to claim 20, wherein the at least one second management target device is determined by at least excluding all of the at least one first management target device from the two or more devices in the step c).

22. The non-transitory computer-readable recording medium according to claim 20, wherein the at least one second management target device is determined by at least excluding some of the at least one first management target device from the two or more devices in the step c).

23. The non-transitory computer-readable recording medium according to claim 22, wherein the at least one second management target device is determined by at least excluding some of the at least one first management target device from the two or more devices, allowing partial duplication of the at least one second management target device and the at least one first management target device, on the condition that a number of the at least one second management target device is not larger than a predetermined upper limit number, in the step c).

24. The non-transitory computer-readable recording medium according to claim 20, wherein the second communication relay apparatus is notified that a device which is included in the management device information and is not retrieved in the device search process should be excluded from at least one management target device of the second communication relay apparatus in the step c).

25. The non-transitory computer-readable recording medium according to claim 20, wherein the step b) further acquires the management device information by sending a transmission request of the management device information to the second communication relay apparatus and receiving information sent from the second communication relay apparatus in response to the transmission request.

26. The non-transitory computer-readable recording medium according to claim 20, wherein the step b) further acquires the management device information by sending a transmission request of the management device information to a management server provided outside the LAN and receiving information sent from the management server in response to the transmission request.

27. The non-transitory computer-readable recording medium according to claim 20, wherein the first communication relay apparatus is an image forming apparatus.

* * * * *